US006611372B1

(12) United States Patent
Peyghambarian et al.

(10) Patent No.: US 6,611,372 B1
(45) Date of Patent: Aug. 26, 2003

(54) ERBIUM AND YTTERBIUM CO-DOPED PHOSPHATE GLASS OPTICAL FIBER AMPLIFIERS USING SHORT ACTIVE FIBER LENGTH

(75) Inventors: Nasser Peyghambarian, Tucson, AZ (US); Shibin Jiang, Tucson, AZ (US)

(73) Assignee: The Arizona Board of Regents on behalf of the University of Arizona, Phoenix, AZ (US)

( * ) Notice: Subject to any disclaimer, the term of this patent is extended or adjusted under 35 U.S.C. 154(b) by 0 days.

(21) Appl. No.: 09/589,764

(22) Filed: Jun. 9, 2000

(51) Int. Cl.$^7$ ................................................. H01S 3/00
(52) U.S. Cl. ................................................. 359/341.1
(58) Field of Search ........................... 359/341.1, 341.3, 359/341.5, 342; 372/6

(56) References Cited

U.S. PATENT DOCUMENTS

| | | | |
|---|---|---|---|
| 4,962,067 A | 10/1990 | Myers | 252/301.4 |
| 4,962,995 A | * 10/1990 | Andrews et al. | 350/96.34 |
| 4,963,832 A | 10/1990 | Desurvire et al. | 385/40 |
| 5,027,079 A | 6/1991 | Desurvire et al. | 359/341.1 |

(List continued on next page.)

FOREIGN PATENT DOCUMENTS

EP 0 843 424 5/1998 ............ H04B/10/17

OTHER PUBLICATIONS

Barbier et al. Amplifying Four–Wavelength Combiner, Based on Erbium/Ytterbium–Doped Waveguide Amplifiers and Integrated Splitters. IEEE Photonics Technology Letters, vol. 9, No. 3, Mar. 1997. pp. 315–317.*

Jiang et al. Laser and thermal performance of a new erbium doped phosphate laser glass. SPIE. vol. 2138. Longer Wavelengt Lasers and Applications. 1994.*

Fournier et al. Potassium ion–exchanged Er–Yb doped phosphate glass amplifier. Electronics Letters, Feb. 13th 1997, vol. 33, No. 4, pp. 293–295.*

Overview of Nd– and Er–Doped Glass Integrated Optics Amplifiers and Lasers, S. Iraj Najafi, SPIE, vol. 2996, pp. 54–61, 1997.

(List continued on next page.)

*Primary Examiner*—Thomas G. Black
*Assistant Examiner*—Deandra M. Hughes
(74) *Attorney, Agent, or Firm*—Oblon, Spivak, McClelland, Maier & Neustadt, P.C.

(57) ABSTRACT

An optical fiber amplifier utilizing a phosphate glass optical fiber highly doped with rare-earth ions such as erbium to exhibit high gain per unit length, enabling the use of short fiber strands to achieve the needed gain in practical fiber optical communication networks. The high-gain phosphate optical glass fiber amplifiers are integrated onto substrates to form an integrated optics amplifier module. An optical pump such as a semiconductor laser of suitable wavelength is used to promote gain inversion of erbium ions and ultimately provide power amplification of a given input signal. Gain inversion is enhanced in the erbium doped phosphate glass fiber by co-doping with ytterbium. A phosphate fiber amplifier or an integrated optics amplifier module utilizing this power amplification can be combined with other components such as splitters, combiners, modulators, or arrayed waveguide gratings to form lossless or amplified components that do not suffer from insertion loss when added to an optical network. The fiber amplifier can be a single fiber or an array of fibers. Further, the phosphate glass fibers can be designed with a temperature coefficient of refractive index close to zero enabling proper mode performance as ambient temperatures or induced heating changes the temperature of the phosphate glass fiber. Large core 50–100 $\mu$m fibers can be used for fiber amplifiers. The phosphate glass composition includes erbium concentrations of at least 1.5 weight percentage, preferably further including ytterbium at 1.5 weight percentage, or greater.

137 Claims, 11 Drawing Sheets

U.S. PATENT DOCUMENTS

| | | | |
|---|---|---|---|
| 5,032,315 A | 7/1991 | Hayden et al. | 252/301.4 |
| 5,200,029 A | 4/1993 | Bruce et al. | 216/24 |
| 5,225,925 A | 7/1993 | Grubb et al. | 359/341.32 |
| 5,322,820 A | 6/1994 | Myers et al. | 501/45 |
| 5,334,559 A | 8/1994 | Hayden | 501/48 |
| 5,425,039 A | 6/1995 | Hsu et al. | 372/6 |
| 5,485,480 A * | 1/1996 | Kleinerman | 372/6 |
| 5,491,708 A | 2/1996 | Malone et al. | 372/41 |
| 5,526,459 A * | 6/1996 | Tanaka et al. | 385/142 |
| 5,532,870 A | 7/1996 | Shigematsu et al. | 359/337.4 |
| 5,555,127 A | 9/1996 | Abdelkader et al. | 359/341.1 |
| 5,644,589 A | 7/1997 | Anthon | 372/92 |
| 5,651,022 A | 7/1997 | Anthon et al. | 372/92 |
| 5,729,646 A * | 3/1998 | Miyagi et al. | 385/125 |
| 5,745,282 A * | 4/1998 | Negi | 359/322 |
| 5,798,306 A | 8/1998 | Dickinson, Jr. | 507/57 |
| 5,805,332 A * | 9/1998 | Gopinath | 359/341 |
| 5,805,755 A | 9/1998 | Amersfoort et al. | 385/131 |
| 5,838,487 A * | 11/1998 | Nilsson et al. | 359/341 |
| 5,872,650 A * | 2/1999 | Lee et al. | 359/341 |
| 5,930,030 A * | 7/1999 | Scifres | 359/341 |
| 5,982,973 A * | 11/1999 | Yan et al. | 372/40 |
| 6,049,415 A | 4/2000 | Grubb et al. | 359/341 |
| 6,192,713 B1 | 2/2001 | Zhang et al. | 65/390 |
| 6,222,974 B1 * | 4/2001 | Nagata | 385/129 |
| 6,266,181 B1 * | 7/2001 | Ohishi et al. | 359/341 |
| 6,288,835 B1 * | 9/2001 | Nilsson et al. | 359/341.3 |
| 6,381,392 B1 * | 4/2002 | Hayden et al. | 372/39 |

OTHER PUBLICATIONS

Park et al., High–Power Er–Yb–Doped Fiber Amplifier with Multichannel Gain Flatness within 0.2 dB over 14 nm, vol. 8, No. 9, Sep. 1996, pp. 1148–1150.

Vienne et al., Fabrication and Characterization of Yb3+: Er3+ Phosphosilicate Fibers for Lasers, Nov. 1998 vol. 10, No. 9. pp. 1990–2001.

Hofer et al., High–Power Side–Pumped Passively Mode–Locked Er–Yb Fiber Laser, vol. 10, No. 9, Sep. 1998, pp. 1247–1249.

D. Barbier, et al., OFC '98 Technical Digest, pp. 45–46, "Net Gain of 27 Db With a 8.6–CM Long Er/Yb–Doped Glass-Planar–Ampliferr", 1998.

M.R.X. De Barros, et al., IEEE Photonics Letters, vol. 8, No. 6, pp. 761–763, "Performance of a High Concentration $Er^{3+}$–Doped Alumino Silicate Fiber Amplifier", Jun. 1996.

O. Blum, et al., CLEO '96, pp. 462–463, "Selective Oxidation of Integrated Optical Elements", 1996.

J.L. Doualan, et al., Journal of Luminescence, vol. 72, No. 74, pp. 179–182, "Excited State Absorption of Erbium-Doped Laser Crystals", 1997.

B.C, Hwang, et al., Electronics Letters, vol. 35, No. 12, pp. 1–2, "Erbium–Doped Phosphate Glass Fibre Amplifiers with Gain Per Unit Length of 2.1 Db–CM", Jun. 10, 1999.

Shibin Jiang, et al., Journal of Non–Crystalline Solids, vol. 239, pp. 143–148, "$Er^{3+}$Doped Phosphate Glasses and Lasers", 1998.

Shibin Jiang, et al., Journal of Non–Crystalline Solids, vol. 263 & 264, pp. 364–368, "$Er^{3+}$Doped Phosphate Glasses for Fiber Amplifiers With High Gain Per Unit Length", 2000.

Shibin Jiang, et al., Optical Engineering, vol. 37, No. 12, pp. 3282–3286, "New $Er^{3+}$–Doped Phosphate Glass for Ion–Exchanged Waveguide Amplifiers", Dec. 1998.

Shibin Jiang, et al., $25^{th}$ Anniversary of Optical Communication Conference, pp. PD5–1 to PD5–3, "Net Gain of 15.5 dB From a 5.1CM–Long $Er^{3+}$–Doped Phosphate Glass Fiber", Mar. 7–10, 2000.

Shibin Jiang, et al., SPIE, vol. 3280, pp. 40–45, "Development and Characterization of a New $Er^{3+}$Doped Phosphate Glass for Planar Waveguide Lasers and Amplifiers", 1998.

T. Kitagawa, et al., Electronics Letters, vol. 29, No. 1, pp. 131–132, "Erbium–Doped Composite Glass Waveguide Amplifier", Jan. 7, 1993.

J.–P. Laine, et al., Optical Engineering, vol. 37, No. 4, pp. 1182–1187, "Modiling of Planar Ion–Exchanged $Er^{3+}$–Doped Glass Waveguide Amplifiers", Apr. 1998.

Y.L. Lu, et al., Applied Physics B, vol. 62, pp. 287–291, "Fluorescence and Attenuation Properties of $Er^{3+}$–Doped Phosphate–Glass Fibers and Efficient Infrared–to–Visible Up–Conversion", 1996.

Ya–Lin Lu, et al., Chapman & Hall, pp. 5705–5710, "Properties of $Er^{3+}$–Doped Phosphate Glasses and Glass Fibers and Efficient Infrared to Visible Upconversion", 1995.

D.E. McCumber, Physical Review, vol. 134, No. 2A, pp. 13–20, "Theory of Phonon–Terminated Optical Masers", Apr. 20, 1964.

J. McDougall, et al., Physics and Chemistry of Glasses, vol. 37, No. 2, pp. 73–75, "Spectroscopic Properties of $Er^{3+}$ in Fluorozirconate, Germanate, Tellurite and Phosphate Glasses", 1996.

R.J. Mears, et al., Electronics Letters, vol. 23, No. 19, pp. 1026–1028, "Low–Noise Erbium–Doped Fibre Amplifier Operating at 1.54 $\mu M$", Sep. 10, 1987.

W.J. Miniscalco, et al., Optical Letters, vol. 16, No. 4, pp. 258–260, "General Procedure for the Analysis of $Er^{3+}$ Cross Sections", Feb. 15, 1991.

S. Iraj Najafi, et al., SPIE, vol. 2996, pp. 54–61, "Overview of Nd–And Er–Doped Glass Integrated Optics Amplifiers and Lasers", 1997.

Toshihiro Nishi, et al., Jpn. J. Appl. Phys., vol. 31, No. 2B, pp. L177–L179, "The Amplification Properties of a Highly $Er^{3+}$–Doped Phosphate Fiber", Feb. 15, 1992.

T. Ohtsuki, et al., J. Appl. Phus., vol. 78, No. 6, pp. 3617–3621, "Gain Characteristics of a High Concentration $Er^{3+}$–Doped Phosphate Glass Waveguide", Sep. 15, 1995.

T. Ohtsuki et al., Journal of Optical Society of America B, vol. 14, No. 7, pp. 1838–1845, "Cooperative Upconversion Effects on the Performance of $Er^{3+}$–Doped Phsophate Glass Waveguide Amplifiers", Jul. 1997.

H. Ono, et al., Electronic Letters, vol. 32, No. 17, pp. 1586–1587, "$Er^{3+}$–Doped Fluorophosphate Glass Fibre Amplifier for WDM Systems", Aug. 15, 1996.

P.M. Peters, et al., Appl. Phys. Lett., vol. 70, No. 5, pp. 541–543, "X–Ray Absorption Fine Structure Determination of the Local Environment of $Er^{3+}$ in Glass", Feb. 3, 1997.

W.Q. Shi, et al., Journal of Optical Society of America, vol. 7, No. 8, pp. 1456–1462, "Effect of Energy Transfer Among $Er^{3+}$ Ions on the Fluorescence Decay and Lasing Properties of Heavily Doped Er: $Y_3Al_5O_{12}$", Aug. 1990.

A. Shooshtari, et al., SPIE, vol. 3278, pp. 149–165, "$Yb^{3+}$ Sensitized $Er^{3+}$–Doped Waveguide Amplifiers: A Theoretical Approach", 1998.

G.G Vienne, et al., Journal of Lightwave Technology, vol. 16, No. 11, pp. 1990–2001, "Fabrication and Characterization of $YB^{3+}:Er^{3+}$ Phosphosilicate Fibers For Lasers", Nov. 1998.

Y.C. Yan, et al., Appl. Phys. Lett., vol. 71, No. 20, pp. 2922–2924, "Erbium–Doped Phosphate Glass Waveguide on Silicon With 4.1 dB/cm Gain at 1.535 $\mu M$", Nov. 17, 1997.

D.C. Yeh, et al., J. Appl. Phys., vol. 69, No. 3, pp. 1648–1653, "Intensity–Dependent Upconversion Efficiencies of $Er^{3+}$ Ions in Heavy–Metal Fluoride Glass", Feb. 1, 1991.

* cited by examiner

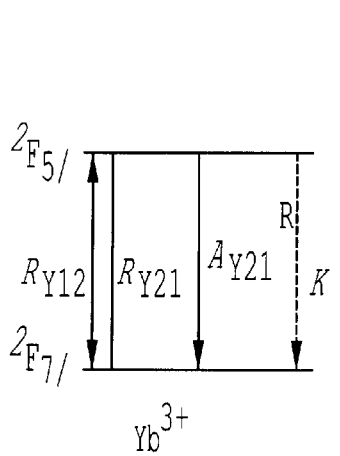
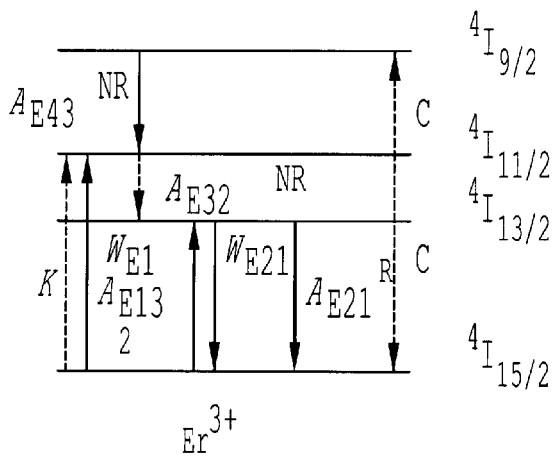
FIG. 1A  FIG. 1B
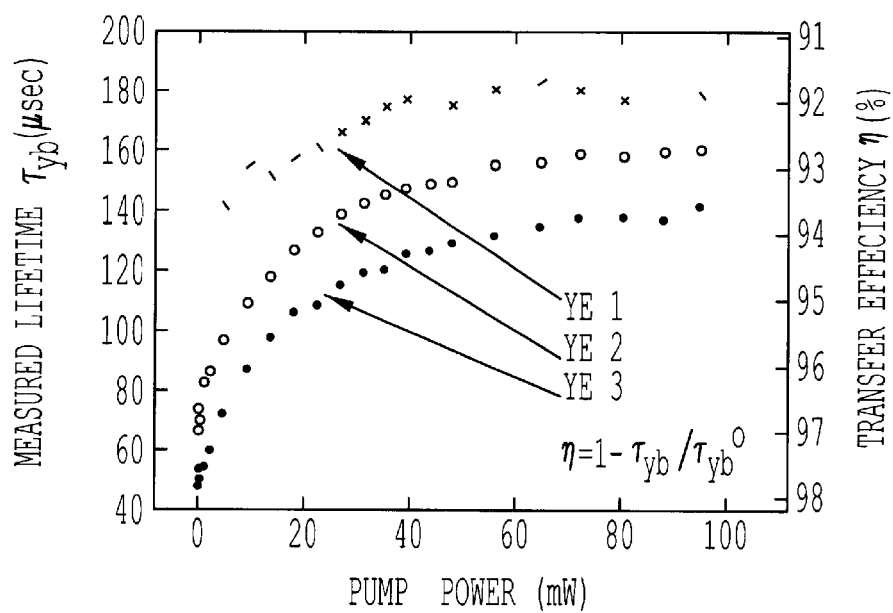
YE 1: 2wt%Yb$_2$O$_3$+2wt%Er$_2$O$_3$;
YE 2: 4wt%Yb$_2$O$_3$+2wt%Er$_2$O$_3$;
YE 3: 6wt%Yb$_2$O$_3$+2wt%Er$_2$O$_3$;
FIG. 2

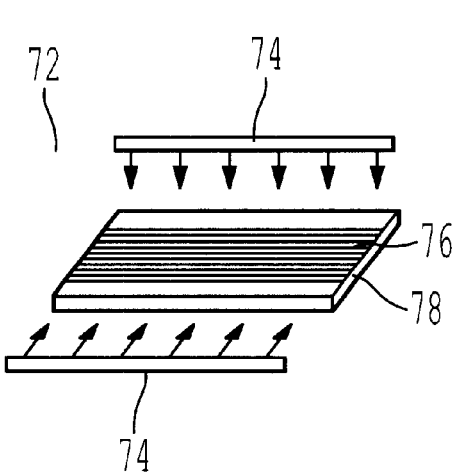
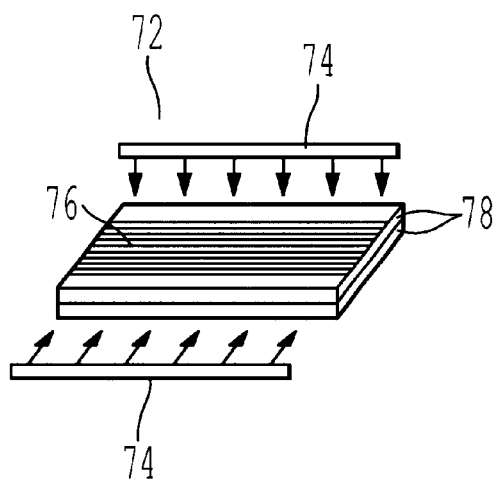
*FIG. 15A*      *FIG. 15B*
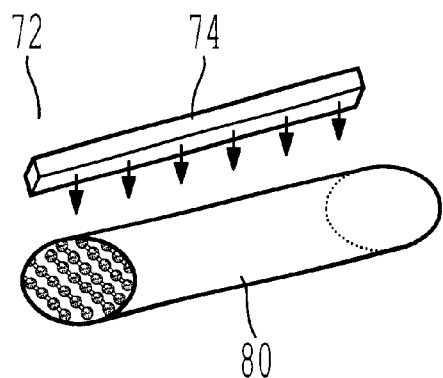
*FIG. 15C*

ERBIUM AND YTTERBIUM CO-DOPED PHOSPHATE GLASS OPTICAL FIBER AMPLIFIERS USING SHORT ACTIVE FIBER LENGTH

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contracts DASG60-98-M-0090 and DASG60-99-C-0064 awarded by the Ballistic Missile Defense Organization.

BACKGROUND OF THE INVENTION

Field of the Invention

The invention is related to optical amplifiers, more particularly, to rare-earth doped phosphate optical fibers for amplifiers pumped by diode or solid state laser sources. The rare-earth ions, erbium and ytterbium, are co-doped at high levels to provide for extremely high gain. Erbium ion concentration is increased to provide very high active ion content. Ytterbium ion concentration is increased to provide efficient absorption of pump power. The phosphate glass fiber provides for a low-loss and stable fiber host. Phosphate glass fibers can be produced with a temperature coefficient of refractive index close to zero.

BACKGROUND OF THE INVENTION

Deregulation, long distance price declines, bandwidth stockpiling, and internet usage are driving bandwidth demand in telecom and datacom networks. Data traffic is now growing at 100 percent or more per annum, straining global fiber capacity. Dense Wavelength Division Multiplexing (DWDM), where multiple wavelength channels propagate within a single fiber multiplies fiber capacity by 2–128 times or more, is an approach for extending carrier capacity without the need of deploying new fiber. Systems being deployed today generally can transmit from 8 up to 128 channels in the 1550 nm low-dispersion window. Channel spacing ranges from 1.6 nm (200 GHz) to 0.4 nm (50 GHz).

Optical amplifiers are considered enabling components for bandwidth expansion in DWDM fiber optic communications systems. In particular, silica glass Erbium Doped Fiber Amplifiers (EDFA) exhibit many desirable attributes including high gain, low noise, negligible crosstalk and intermodulation distortion, bit-rate transparency, and polarization insensitive gain. These properties make optical fiber amplifiers superior to semiconductor devices as amplifiers in fiber optic systems. Moreover, fiber-based amplifiers do not require conversion from electrical energy to photon energy as do semiconductor devices. In a communications system of any significant size, there is typically a distribution network that includes long communication paths and nodes where the network branches. In such a network, amplifiers are required in order to maintain the amplitude of the signal and the integrity of any data in route between a source and destination. For these amplifiers to function properly, the amplifiers must exhibit high small signal gains and/or high output saturation powers.

Application of erbium-doped optical fibers as amplifiers has received considerable attention recently because the characteristic gain bandwidth of these fibers is within the telecommunications window of 1.5 $\mu$m commonly used in fiber optic communications systems. Since the announcement of a single mode $Er^{3+}$doped fiber amplifier (EDFA) in 1987 at the University of Southampton, enormous research has been performed, and more than 400 U.S. patents have been issued in fiber amplifiers. To date, all erbium fiber amplifiers use erbium doped silica fibers more than one meter long to achieve greater than 20 dB gain near the 1.54 $\mu$m range. More commonly, the length of the erbium doped silica fiber is approximately 10 to 20 meters. Such lengths are not practical for assembly into integrated optical components. There is a compelling need for amplifiers that can introduce high gain into an integrated, compact package.

To shorten length in fiber amplifiers, high gain must be achieved. In order to enable fiber amplifiers of only a few centimeters in length, magnitudes of doping two orders higher than what is commercially achievable (~$10^{18}$ cm$^{-3}$) in silica fiber amplifiers is required. However, in silica fiber, cooperative upconversion and ion clustering effects develop from the interactions between nearby ions in silica glass, and electrons depopulate from the erbium metastable level ($^4I_{13/2}$). Thus, increased doping in silica glass does not improve gain.

Other glasses such as for example phosphate glasses exhibit high solubility and large emission cross sections for many rare-earth ions. Phosphate glasses for optical components have been investigated. Y. L. Lu, Y. et al., in "Fluorescence and attenuation properties of $Er^{+3}$-doped phosphate glass fibers and efficient infrared-to-visible up-conversion," *Applied Physics B*, Vol. 62, pp.287–291 (1996) and Ya Lin Lu et al., in "Properties of $Er^{+3}$ doped phosphate glasses and glass fibers and efficient infrared to visible upconversion," *Journal of Materials Science*, Vol. 30, No. 22, Nov. 15, 1995, pp.5705–10, (1995) discuss phosphate glass fiber for use in up-conversion schemes. S. Jiang et al., in "$Er^{+3}$ doped phosphate glasses and lasers," *Journal of Non Crystalline Solids*, Vol.239, No. 1–3, October 1998, pp. 143–8, show phosphate glasses for application as bulk lasers. T. Nishi et al., in "The amplification properties of a highly $Er^{+3}$ doped phosphate fiber," *Jpn. J Appl. Phys.*, Vol. 31 (1992), Pt. 2, 2B, pp. L177–L179, show phosphate fiber with moderate erbium oxide doping. The maximum gain per unit length reported by Nishi et al. was only 1 dB/cm. S. Jiang, T. Luo et al. in "New Er 3+ doped phosphate glass for ion-exchanged waveguide amplifiers," *Optical Engineering*, Vol. 37, No. 12, December 1998, pp. 3282–6, disclose phosphate glasses for application in ion-exchanged waveguide amplifiers.

In addition, a number of patents have addressed doped glasses in various optical applications. For example, Hsu et al. (U.S. Pat. No. 5,425,039), Myers (U.S. Pat. No. 4,962,067), Myers et al. (U.S. Pat. No. 4,333,848), Myers et al. (U.S. Pat. No. 4,248,732), Myers et al. (U.S. Pat. No. 4,075,120), each disclose doped fibers for application as fiber lasers. In addition, Myers et al. (U.S. Pat. No. 5,322,820) and Myers (U.S. Pat. No. 5,164,343) disclose various glass compositions for laser applications. Grubb et al. (U.S. Pat. No. 5,225,925) disclose silica fibers or phosphorous doped silica fiber. Andrews et al. (U.S. Pat. No. 4,962,995) disclose glasses that are optimized for pumping by 800 nm laser light.

Recently, Y. C. Yan et al., in "Net optical gain at 1.53 $\mu$m in an Er-doped phosphate glass waveguide on silicon," *Optical Amplifiers and Their Applications, Topical Meeting. OSA Trends in Optics and Photonics Series*, Vol. 16. Opt. Soc. America, Washington, D.C., USA; 1997; xlv+526, pp.93–5, investigated doped phosphate glasses as a high gain medium for planar waveguide amplifiers at wavelength of 1.5 $\mu$m. Y. C. Yan et al., in "Erbium-doped phosphate glass waveguide on silicon with 4.1 dB/cm gain at 1.535 μm," *Applied Physics Letters*, Vol.71, No. 20, Nov. 17, 1997, pp. 2922–4 reported a gain of 4.1 dB in a 1 cm long phosphate glass waveguide prepared by an R-F sputtering technique. D. Barbier et al., in "Net gain of 27 dB with a 8.6-cm-long Er/Yb-doped glass-planar-amplifier," *OFC '98 Optical Fiber Communication Conference and Exhibit, Technical Digest*, Conference Edition 1998 OSA Technical Digest Series Vol.2 (IEEE Cat. No.98CH36177), Opt. Soc. America, Washington, D.C., USA; 1998; vii+421, pp.45–6, demonstrated a net gain of 27 dB in a 8.6 cm long ion-exchanged Er/Yb-doped phosphate glass waveguide.

Despite the high gains achieved for example in phosphate glass waveguides, planar waveguide amplifiers have significant disadvantages when compared with fiber amplifiers including polarization sensitivity, optical mode mismatch between waveguides and fiber networks, large propagation losses, and complicated fabrication processes.

SUMMARY OF THE INVENTION

One object of the invention is to provide a phosphate glass optical fiber amplifier with a gain per unit length, greater than 1.5 dB/cm and preferable over 3 dB/cm.

Another object of the invention is to provide a high gain per unit length doped phosphate glass fiber which can be utilized as a fiber amplifier in an optical communications system.

Another object of the invention is to provide an erbium and ytterbium codoped phosphate glass fiber with high (concentrations well above concentrations deemed practical by current wisdom) erbium and ytterbium co-doping concentrations for high gain amplification within a short length of the optical fiber. A short-length optical fiber amplifier utilizing the high gain, short-length fiber is compatible with V-groove and micro-machining fabrication processes, making the short-length fibers compatible and integratable into optical component modules.

Still a further object of the invention is to provide a phosphate glass fiber with a core containing erbium (as $Er_2O_3$) and ytterbium (as $Yb_2O_3$) and a phosphate glass clad without erbium or ytterbium, wherein the phosphate glass fiber is manufactured using a rod-in-tube technique.

Another object of the invention is the application of the phosphate fiber in an optical amplifier, preferably in an integrated amplified or lossless splitter module, wherein a system signal is amplified (with the assistance of a pump laser diode) and fed to a splitter. The fiber may be only a few centimeters in length but exhibits a gain coefficient greater than 3 dB/cm at 1.54 microns.

Yet, another object of the invention is the application of the phosphate fiber in an optical amplifier, preferably in an integrated amplified or lossless combiner module, wherein a system signal is amplified (with the assistance of a pump laser diode) and fed to a combiner. The fiber may be only a few centimeters in length but exhibits a gain coefficient greater than 3 dB/cm at 1.54 microns.

A further object of the invention is the application of the phosphate fiber in an optical amplifier, preferably in an integrated amplified or lossless arrayed waveguide grating module, wherein the system signal channels are amplified (with the assistance of a pump laser diode) and fed to an arrayed waveguide grating. The fiber may be only a few centimeters in length but exhibits a gain coefficient greater than 3 dB/cm at 1.54 microns.

Still a further object of the invention is the application of the phosphate fiber in an optical amplifier, preferably in an integrated amplified or lossless modulator module, wherein the system signals are amplified (with the assistance of a pump laser diode) and fed to a Lithium Niobate optical modulator. The fiber may be only a few centimeters in length but exhibits a gain coefficient greater than 3 dB/cm at 1.54 microns.

Still another object of the invention to provide an efficient, long-lived erbium and ytterbium glass optical amplifier that is generally suitable for a variety of components in metro and local network applications, specifically in the area of fiber optic communication networks.

As such, one object of the invention is to provide doped phosphate glasses with a temperature coefficient of refractive index close to zero.

Another object is to provide an array of doped phosphate glass fibers mounted in a groove on a substrate such as for example a V-groove, where the array is pumped by a multi-mode laser diode bar orthogonal to the array.

Another object of the invention is to provide an erbium doped fiber with a large light-guiding region (diameter of the core ranging from 50 to 300 μm, which is much larger than in erbium doped fibers deemed practical by current wisdom). The fiber may be only a few centimeters in length and is pumped with one or more high-power multi-mode 980 nm light-emitting laser diodes, each having an emitting cross-sectional area on the order of 1 μm×100 μm.

These and other objects are achieved according to a fiber amplifier of the present invention utilizing a phosphate glass optical fiber highly doped with rare-earth ions such as erbium, and preferably co-doped with ytterbium to enhance gain. The phosphate glass optical fibers exhibit high gain per unit length, enabling the use of short fiber strands to achieve the needed gain in practical fiber optical communication networks.

According to one aspect of the present invention, the high-gain phosphate optical glass fiber amplifiers are integrated onto substrates, such as in grooved substrates, to form an integrated optics amplifier module. An optical pump such as a semiconductor laser of suitable wavelength is used to promote gain inversion of erbium ionic metastable states and ultimately provide power amplification of a given input signal.

According to another aspect of the present invention, a phosphate fiber amplifier is integrated with other components such as splitters, combiners, modulators, or arrayed waveguide gratings to form lossless or amplified components that do not suffer from insertion loss when added to an optical network.

According to a further aspect of the present invention, the fiber amplifier includes a single fiber or an array of fibers. Further, the phosphate glass fibers are designed with a temperature coefficient of refractive index close to zero enabling proper mode performance as ambient temperatures or induced heating changes the temperature of the phosphate glass fiber. Fiber core diameters from standard sizes such as for example 5 μm to large core sizes such as for example 50–100 μm fibers are used for fiber amplifiers in the present invention.

According to one aspect of the present invention, it is recognized that erbium doped glass fibers, containing erbium concentrations far beyond the generally accepted optimum concentration for erbium ions in silica fiber, show fiber amplification in a short length and thus enable production of integrated high gain optical components.

According to a further aspect of the present invention, the erbium doped glass fibers are co-doped with ytterbium to enhance pumping of the erbium metastable levels and the resultant gain in the phosphate fibers.

Further, according to the present invention, there is provided a novel phosphate glass composition including the following ingredients by weight percentages: $P_2O_5$ from 30 to 80 percent, $Yb_2O_3$ from 0 to 12 percent, $Er_2O_3$ from 2.5 to 12 percent, $R_2O$ from 0 to 5 percent $L_2O_3$ from 5 to 30 percent, MO from 5 to 30 percent, where the sum of the weight percentages of $Yb_2O_3$ and $Er_2O_3$ is 2.5% or greater, $R_2O$ is selected from the alkali metal oxide group consisting of $Li_2O$, $K_2O$, $Na_2O$, $Rb_2O$, and mixtures thereof, MO is selected from the alkaline earth oxide group consisting of BaO, BeO, MgO, SrO, CaO, ZnO, PbO and mixtures thereof, and $L_2O_3$ is selected from the transition metal oxide group consisting of $Al_2O_3$, $B_2O_3.Y_2O_3$, $La_2O_3$, and mixtures thereof.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1 is a schematic energy level diagram of the $Yb^{+3}/Eb^{+3}$ co-doped system;

FIG. 2 is a graph depicting energy transfer efficiency from $Yb^{3+}$ ionic energy levels to $Er^{3+}$ ionic energy levels under different pumping powers for different doping concentrations of $Yb_2O_3$ and $Er_2O_3$;

FIG. 15a is a schematic of one embodiment of the fiber array amplifier;

FIG. 15b is a schematic of another embodiment of the fiber array amplifier;

FIG. 15c is a schematic of another embodiment of the fiber array amplifier;

DETAILED DESCRIPTION OF THE INVENTION

Figure 3:
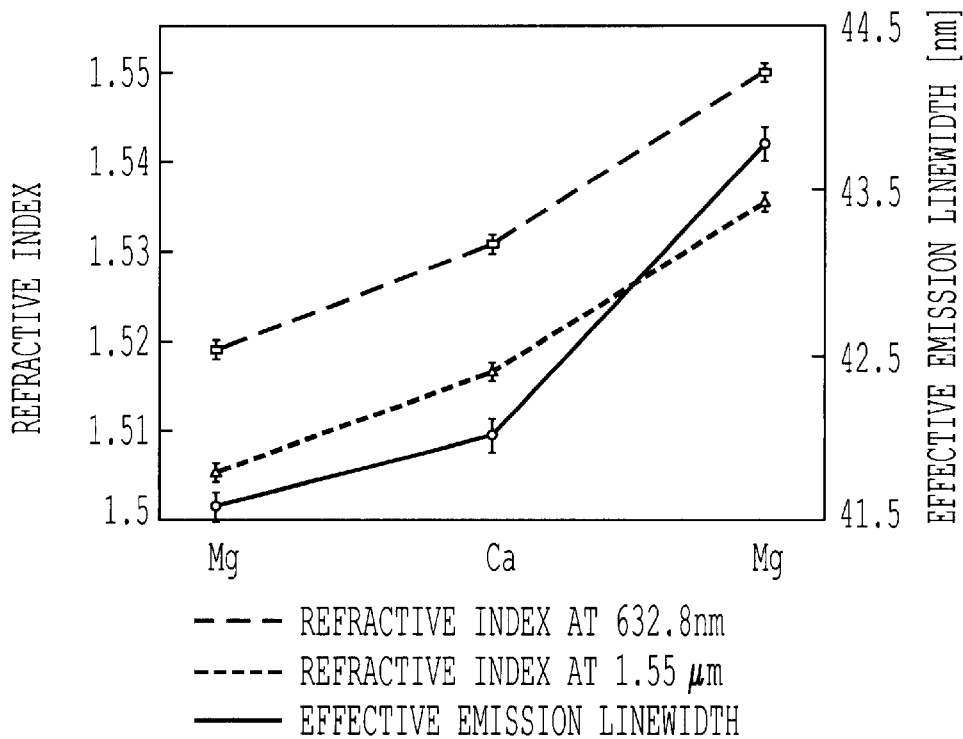
FIG. 3 is a graph depicting the influence of glass composition with different alkali earth ions on refractive index and on the effective emission linewidth.

Referring now to the drawings, wherein like reference numerals designate identical or corresponding parts throughout the several views, FIG. 1 is a schematic energy level diagram of a $Yb^{3+}$ and $Er^{3+}$ ionic energy levels in a phosphate glass host.

According to one embodiment of the present invention, pumping of an erbium-doped phosphate glass populates the erbium metastable state creating a population inversion which under an input signal produces stimulated emission and amplification of the input signal. More specifically, the amplification process is explained in reference to energy levels shown in FIG. 1. The $Er^{3+}$ ionic energy states are shown on the right hand side of FIG. 1. Typically, a pump light excites electrons from the ground state $^4I_{15/2}$ to an upper energy state such as $^4I_{11/2}$. Higher erbium doping levels allows more absorption of the pump light and ultimately higher gain. Once electrons are excited to the $^4I_{11/2}$ state, relaxation occurs through phonon processes in which the electrons relax to the $^4I_{13/2}$ state, giving up energy as phonons to the glass host material. The state $^4I_{13/2}$ is a metastable state which normally does not readily emit a photon and decay to the ground state (i.e., the $^4I_{15/2}$ state). In the fiber amplifiers of the present invention, stimulated emission occurs when an input signal at 1.5 µm is introduced into the optical fiber. The stimulated emission amplifies the input 1.5 µm signal.

According to another embodiment of the present invention, co-doping with ytterbium enhances population inversion and stimulated emission from the erbium $^4I_{13/2}$ metastable state. More specifically, the enhancement process is explained in reference to energy levels shown in FIG. 1. As shown in FIG. 1, the $Yb^{3+}$ excited state $^2F_{5/2}$ are pumped from the $Yb^{3+}$ $^2F_{7/2}$ ground state with the same pump wavelength that is used to excite upward transitions from the erbium ground state $^4I_{15/2}$. Energy levels of the excited ytterbium $^2F_{5/2}$ state coincide with energy levels of the erbium $^4I_{15/2}$ state permitting energy transfer (i.e. electron transfer) from the pumped ytterbium $^2F_{5/2}$ state to the erbium $^4I_{11/2}$ state. Thus, pumping ytterbium ionic energy states provides a mechanism for populating the metastable erbium $^4I_{13/2}$ state, permitting even higher levels of population inversion and more stimulated emission than with erbium doping alone.

Ytterbium ions exhibit not only a large absorption cross section but also a broad absorption band between 900 and 1100 nm. Furthermore, the large spectral overlap between $Yb^{3+}$ emission ($^2F_{7/2}-^2F_{5/2}$) and $Er^{3+}$ absorption ($^4I_{15/2}-^4I_{13/2}$) results in an efficient resonant energy transfer from the $Yb^{3+}$ $^2F_{5/2}$ state to the $Er^{3+}$ $^4I_{13/2}$ state. The energy transfer mechanism in a $Yb^{3+}/Er^{3+}$ co-doped system is similar to that for cooperative upconversion processes in an $Er^{3+}$ doped system. However, interactions are between $Yb^{3+}$ (donor) and $Er^{3+}$ (acceptor) ions instead of between two excited $Er^{3+}$ ions.

Thus, the present invention utilizes either erbium doped or erbium/ytterbium co-doped phosphate glass fibers doped at concentrations orders of magnitude higher than what is available in silica fibers. The increased doping levels in the phosphate glass fibers do not suffer from a high cooperative upconversion rate. Thus, cooperative upconversion effects in phosphate glass at high levels of erbium doping concentration, while significantly smaller than in silica glass, can be further reduced in phosphate glasses by the introduction of ytterbium doping. Further, it can be seen from FIG. 2, a graph depicting energy transfer efficiency from $Yb^{3+}$ ions to $Er^{3+}$ ions, that the energy transfer efficiency is greater than 91% for the co-doping concentrations shown. FIG. 2 shows that 6 weight % $Yb_2O_3$ and 2 weight % $Er_2O_3$ produce measured lifetimes for the ytterbium $^2F_{5/2}$ state of about 180 µs with a transfer efficiency to the erbium $^4I_{13/2}$ state of 92%. Compared to silicate glasses, the large phonon energy in the phosphate host increases the transition probability for $^4I_{11/2}$–$^4I_{13/2}$ relaxation which prevents the back energy transfer from $Er^{3+}$ to $Yb^{3+}$.

In one embodiment of the present invention, optical fibers utilize a doped phosphate glass fiber containing the following ingredients by weight percentages: $P_2O_5$ from 30 to 80 percent, $Yb_2O_3$ from 0 to 12 percent, $Er_2O_3$ from 2.5 to 12 percent, $R_2O$ from 0 to 5 percent $L_2O_3$ from 5 to 30 percent, MO from 5 to 30 percent, where $R_2O$ is selected from the alkali metal oxide group consisting of $Li_2O$, $K_2O$, $Na_2O$, $Rb_2O$, and mixtures thereof, where the sum of the weight percentages of $Yb_2O_3$ and $Er_2O_3$ is 2.5% or greater, MO is selected from the alkaline earth oxide group consisting of BaO, BeO, MgO, SrO, CaO, ZnO, PbO and mixtures thereof, and $L_2O_3$ is selected from the transition metal oxide group consisting of $Al_2O_3$, $B_2O_3$, $Y_2O_3$, $La_2O_3$, and mixtures thereof As a result, an active fiber length for 20 dB gain is expected to be less than 7 cm.

Thus, the high doping concentrations possible, the low cooperative upconversion rate, the high transfer efficiencies, and the high gains make doped phosphate glass fibers ideal for high gain optical fiber amplifiers.

Besides these properties, doped phosphate glasses in one embodiment of the present invention can be comprised of components which yield a temperature coefficient of refractive index close to zero or negative. Athermal performance can be achieved when the temperature coefficient of refractive index is negative. An optical path length for a glass is a product of a length of the glass and the refractive index. Achieving athermal performance results in a temperature coefficient for the optical path length close to zero, which can be described by the following equation:

$$G = \alpha(n-1) + dn/dt \quad (2)$$

where, G is the temperature coefficient of optical path length, α is the linear coefficient of thermal expansion, dn/dt is the temperature coefficient of refractive index. Since α is always positive, dn/dt has to be negative in order to make G equal to zero.

In active laser glass elements, heating occurs from the pump source. In order to dissipate the heat, laser glass elements are typically gas or liquid cooled to maintain the laser glass elements within a specified operating temperature range. Cooling of the active laser glass elements creates a thermal gradient. The temperature near the center is higher than the temperature close to the cooling. When dn/dt is positive, the optical path length near the center becomes longer, causing a distortion of laser beam. For a typical silicate glass, the refractive index increases with temperature because polarizability of electron clouds in the silicate glasses increases with increased spacing (i.e. expansion of the material upon heating).

In optical fiber amplifiers, the mode profile of the optical fiber changes with the index of the core glass and the cladding glass. However, maintaining a temperature coefficient of the optical path length is not as critical as in a laser glass since the beam in the fiber amplifier is confined by the cladding layer. Nonetheless, a fiber amplifier for telecommunication application has to pass a standard Bellcore test, where the temperature changes from −40° C. to 80° C. The multi-component phosphate glasses must achieve a temperature coefficient of refractive index close to zero by adjusting components in the glass composition. Achieving a temperature coefficient of refractive index close to zero eliminates the influence of changing temperatures from heat generated by unused pumping power and changing environmental temperatures on the mode profile of the fiber. By adjusting BaO and ZnO content in the phosphate glass structure, an approximately zero temperature coefficient of refractive index can be achieved since BaO and ZnO exhibit negative and positive temperature coefficient of refractive index, respectively. Glass network intermediates such as $B_2O_3$ and $Al_2O_3$ are used to fortify the phosphate glass structure. The combination of an aluminum-oxygen tetrahedron or a boron-oxygen tetrahedron with a neighboring phosphorus-oxygen tetrahedron increases the number of bridging oxygen, resulting in a stronger glass structure. In one embodiment of the present invention, $Al_2O_3$ in concentrations from 6 to 11 mole % is used to fortify the glass structure.

Tables 1, 2, and 3 (see below) list glass compositions in mole % of phosphate glasses designed and fabricated, the temperature coefficients of refractive index for aluminum phosphate, barium phosphate and zinc phosphate, and the predicted temperature coefficient of refractive index for the fabricated glasses.

TABLE 1

Glass compositions designed and fabricated

| Glass | P2O5 | Al2O3 | $Er_2O_3 + Yb_2O_3 + La_2O_3$ | BaO | ZnO |
|---|---|---|---|---|---|
| PZI | 63 | 8.5 | 3.0 | 25.5 | 0 |
| PZ2 | 63 | 8.5 | 3.0 | 25.5CaO* | 0 |
| PZ3 | 63 | 8.5 | 3.0 | 25.5MgO* | 0 |
| PZ4 | 63 | 8.5 | 3.0 | 0 | 25.5 |
| PZ5 | 63 | 8.5 | 3.0 | 9.0 | 16.5 |
| PZ6 | 63 | 8.5 | 3.0 | 19 | 6.5 |
| PZ7 | 63 | 9.5 | 3.0 | 21 | 4.5 |
| PZ8 | 63 | 8.5 | 3.0 | 23 | 2.5 |

*where 25.5 CaO indicates CaO has been substituted for the BaO additive and 25.5 MgO indicates MgO has been substituted for the BaO additive.

TABLE 2

The temperature coefficient of refractive index of common phosphate glasses

| Glass | dn/dt ($10^{-6}$) |
|---|---|
| $Al(PO)_3$ | +5.0 |
| $Ba(PO)_2$ | −10.6 |
| $Zn(PO)_2$ | +5.1 |

TABLE 3

Predicted temperature coefficient of refractive index of the fabricated glasses

| | dn/dt ($10^{-6}$) | |
|---|---|---|
| Glass | Using Reference [1] | Using Reference [2] |
| PZ1 | −1.8 | −1.4 |
| PZ2 | +0.3 | +3.4 |
| PZ3 | +1.6 | +5.5 |
| PZ4 | +2.2 | +6.5 |
| PZ5 | +0.8 | +3.7 |
| PZ6 | −0.8 | +0.6 |
| PZ7 | −1.1 | 0 |
| PZ8 | −1.4 | −0.6 |

Although there are some numerical differences in the predicted temperature coefficient of refractive index using reference [1]: Optical Properties of Glass, Edited by Donald R. Uhlmann and Norbert J. Kreidl, The American Ceramic Society, Inc., 1991 and reference [2]: Optical Glasses (Chinese), Edited by Fuxi Gan, Academic Publication, Beijing, 1985, Table 3 indicates that the temperature coefficient of refractive index of the glass decreases when the ZnO content increases and the BaO content decreases. The temperature coefficient of refractive index can be adjusted by changing the content of ZnO and BaO. Glasses with a temperature coefficient close to zero can be obtained near the composition of PZ6.

Thus, according to another embodiment of the present invention, the phosphate glass fibers of the present invention can be composed with compositions such that a temperature coefficient close to zero or negative is realized and these compositions can be fortified with $B_2O_3$ or $Al_2O_3$.

Phosphate Glasses

The following disclosure describes in more detail the manufacture and characterization of phosphate glasses suitable for utilization as core or cladding glasses in the phosphate glass fibers of the present invention.

First, two series of glass specimens, $64P_2O_5 \cdot 12Al_2O_3 \cdot 3.5(Er_2O_3+La_2O_3) \cdot 20.5MO$ (M=Mg, Ca, Ba) (mole %) and $64P_2O_5 \cdot 3.5(Er_2O_3+La_2O_3) \cdot (21.5-x)Al_2O_3 \cdot (11-x)BaO$, (x=0, 3.5, 6.5, and 9.5) (mole %) were prepared to investigate the influence of glass composition on spectral properties, refractive index, and thermal properties. Compounds with less than 10 ppm of iron or copper were used as the starting chemicals for glass preparation. The mixed chemicals were melted in an electric furnace using a quartz crucible at 1250° C. The liquid was then held at temperature for thirty minutes. After fusing, the glass liquid was transferred to a platinum crucible, and the temperature was increased to 1350° C. Nitrogen gas was purged through the liquid to remove hydroxyl ions ($OH^{-1}$). The liquid was cast into an aluminum mold. A variety of samples from these specimens were prepared for the measurements. The refractive index of glass was measured with a prism coupler (e.g., a Metricon Model 2010) at 632.8 nm and 1550 nm. The optically polished glass samples with a size of 2 cm×2 cm×0.5 cm were used in the measurements of the absorption spectrum. The thermal expansion coefficient, glass transition temperature, and softening temperature of each sample were measured on a dilatometer. The absorption spectra were recorded on a spectrophotometer (e.g., a Cary 5G).

Figure 4:
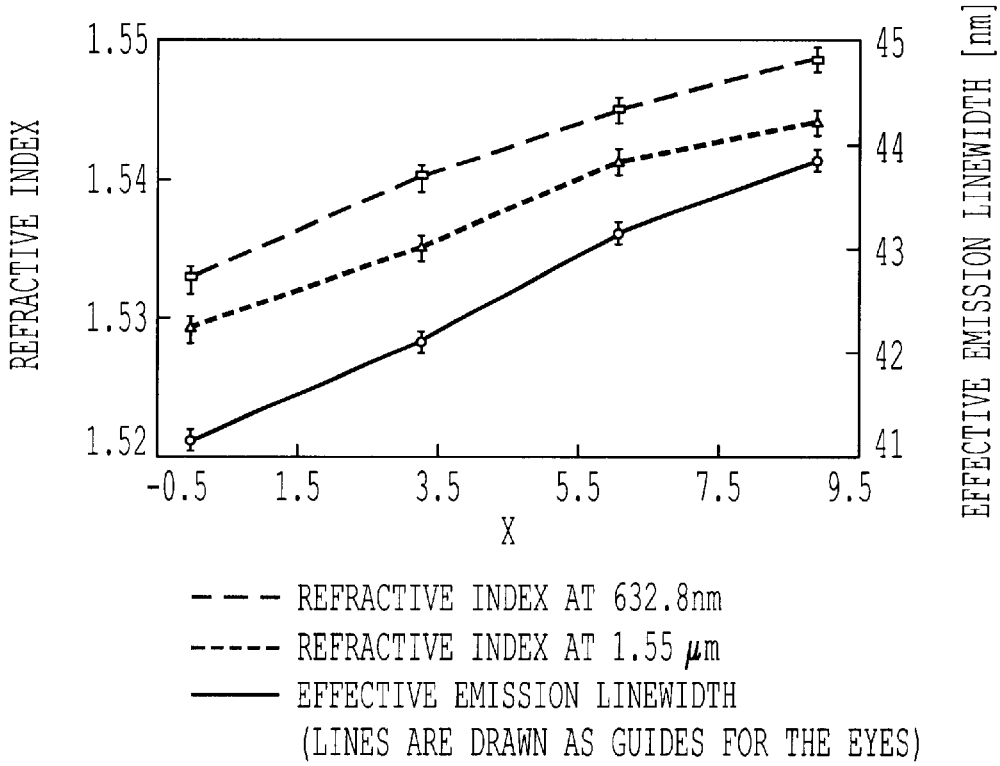
FIG. 4 is a graph depicting the influence of glass composition with different BaO and $Al_2O_3$ concentrations on refractive and effective emission linewidth.

The effect of glass compositions on the absorption linewidth of the $^4I_{15/2}-^4I_{13/2}$ transition of the emission spectrum of erbium ions was investigated. The linewidth becomes increasingly important due to the emerging wavelength division multiplexing (WDM) technology. FIGS. 3 and 4 show the influence of glass composition on the refractive index and the effective linewidth. FIG. 3 shows that the refractive index of phosphate glass increased when the ionic size of alkaline earth metal increased from Mg, to Ca, to Ba. FIG. 4 illustrates the effect of the concentration of BaO and $Al_2O_3$ on the refractive index of the samples. The refractive index increased when the concentration of BaO increased and the concentration of $Al_2O_3$ decreased. The effective linewidth is defined as the integration of a band over wavelength and dividing by the maximum. FIG. 3 indicates that the effective emission linewidth for the $^4I_{13/2}-^4I_{15/2}$ transition increases with increasing ionic size of alkaline earth ions. When the concentration of BaO increases and the concentration of $Al_2O_3$ decreases, the effective emission linewidth of the $^4I_{13/2}-^4I_{15/2}$ transition increases, as illustrated in FIG. 4.

Figure 5:
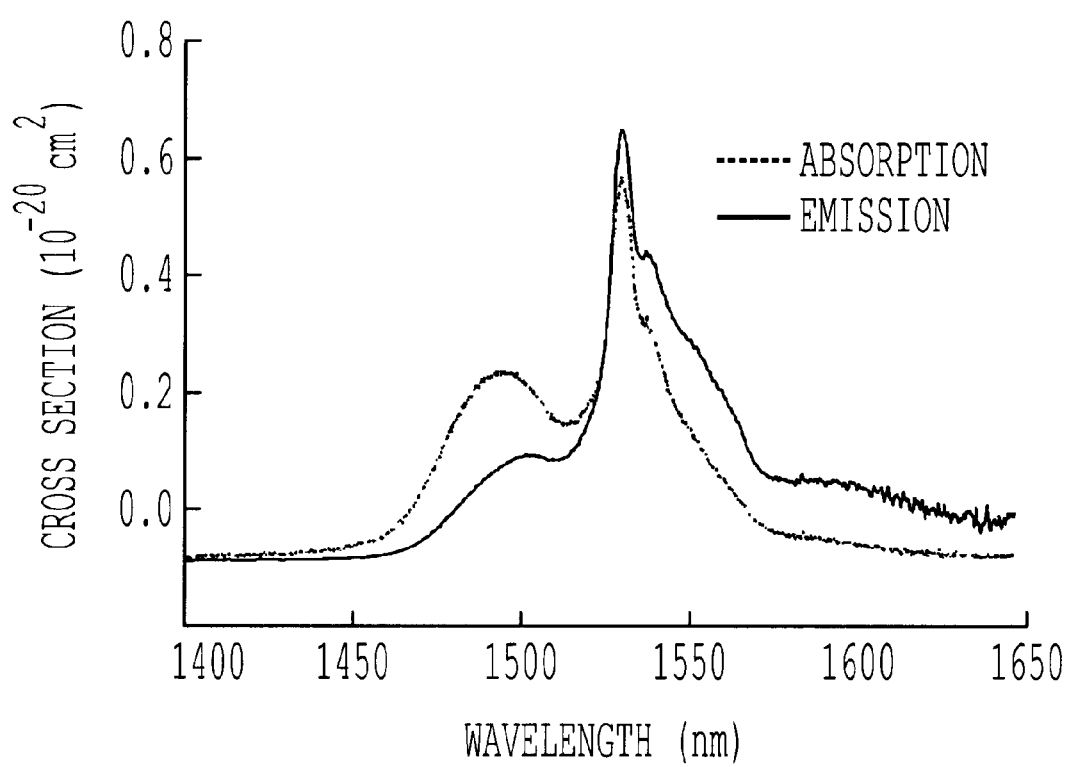
FIG. 5 is a graph showing the absorption and emission cross sections for the $^4I_{15/2} <-> ^4I_{13/2}$ transition band.

Emission spectra were measured on samples with a thickness of 0.4 mm to reduce reabsorption. The emission spectrum measurement at 1.5 μm was carried out using a 980 nm diode as a pumping source. Absolute emission cross section were calculated using McCumber theory. According to McCumber theory, the absorption and emission cross sections are related by equation (1) if the time required to establish a thermal distribution within each manifold is short compared with the lifetime of that manifold.

$$\sigma_e(\nu)=\sigma_a(\nu)\exp[(\epsilon-h\nu)/kT] \quad (1)$$

where $\sigma_a$ and $\sigma_e$ are the absorption and stimulated emission cross section, respectively, v is the photon frequency, $\epsilon$ is the net free energy required to excite one $Er^{3+}$ ion from the $^4I_{15/2}-^4I_{13/2}$ state at temperature T, h is the Planck constant, and k is the Boltzman constant. The absorption cross section was determined from the absorption coefficient. The peak absorption cross section for a $63P_2O_5 \cdot 8.5Al_2O_3 \cdot 3(Er_2O_3+La_2O_3) \cdot 9.5BaO \cdot 16LiO$ (mole %) glass is $0.75 \times 10^{20}$ cm$^2$/ion at 1.5335 μm. The peak stimulated emission cross section is calculated to be $0.82 \times 10^{20}$ cm$^2$/ion at 1.5335 μm. The absorption and fluorescence spectra in the phosphate glass bulk exhibit wide linewidths for $^4I_{13/2}-^4I_{15/2}$ transition of erbium ions (48.63 nm). The absorption and fluorescence spectra of erbium doped phosphate glass bulk are illustrated in FIG. 5.

Next, undoped glasses (no erbium or ytterbium ions) were fabricated as cladding glasses. In order to insure a low stress and birefringence in the fiber, similar thermal characteristics between the core glass and the cladding glass are required. To form waveguide in the core glass with good confinement, a slight lower refractive index of the cladding glass is also required. Theoretical calculation was performed based upon experimental results listed previously (FIGS. 3 and 4). Several melts were made to achieve a thermal behavior match and a required difference of refractive index by modifying the $Al_2O_3$, alkali ions and alkaline earth ions content. The thermal expansion coefficient, glass transition temperature, and softening temperature of each melt were measured on a dilatometer. The refractive index at various wavelengths was determined by prism coupling technique. Cladding glasses were developed with differences in thermal expansion coefficients between the cladding glasses and the core glass less than 3% in the temperature range from 80° C. to 400° C. In addition, glass transition temperatures and softening temperatures of these cladding glasses are also very close to that of the core glass (see Table 4 below). The 10% difference in thermal expansion coefficient between the core glass and the cladding glass is acceptable for fiber fabrication without serious stress in the fiber. Small differences in thermal expansion coefficient, glass transition temperature and softening temperature between the core and cladding glasses ensures high quality of the fiber.

TABLE 4

Glass transition and softening temperatures of core and cladding glasses

| Glass type | Glass transition temperature ($T_g$) | Softening temperature ($T_f$) |
|---|---|---|
| Core glass (P25) | 439° C. | 480° C. |
| Cladding 1-1 | 435° C. | 479° C. |
| Cladding 2-1 | 436° C. | 470° C. |
| Cladding 3-1 | 443° C. | 486° C. |

The respective compositions of a core glass co-doped with erbium and ytterbium and various cladding glasses are given as follows:

Core Glass P25: $63P_2O_5 \cdot 8.5Al_2O_3 \cdot 3$ $(Er_2O_3+La_2O_3+Yb_2O_3) \cdot 9.5BaO \cdot 16Li_2O$ (mole %)

Cladding 1-1: $63P_2O_5 \cdot 10Al_2O_3 \cdot 1.5La_2O_3 \cdot 7BaO \cdot 17Li_2O \cdot 1.5Na_2O$ (mole %)

Cladding 2-1: $63P_2O_5 \cdot 11Al_2O_3 \cdot 4BaO \cdot 17Li_2O \cdot 2.5Na_2O \cdot 2.5CaO$ (mole %)

Cladding 3-1: $62P_2O_5 \cdot 12Al_2O_3 \cdot 4BaO \cdot 17Li_2O \cdot 2.5Na_2O \cdot 2.5CaO$ (mole %)

A good refractive index match with the core glass is another key parameter for the cladding glass besides the thermal behavior match. The refractive index of the cladding and core glasses is listed in the Table 5 (see below). The refractive index at 1.55 μm of cladding glass is 0.48% to 1.14% lower than the core glass P25, which results in numerical apertures from 0.149 to 0.230. With such values of numerical aperture, erbium doped optical fibers with a mode profile perfectly matched with standard telecommunication fiber can be fabricated.

TABLE 5

Refractive index of core and cladding glasses

| Glass type | Refractive index | | | |
|---|---|---|---|---|
| | 632.8 nm | 830 nm | 1300 nm | 1550 nm |
| Core glass (P25) | 1.5431 | 1.5389 | 1.5318 | 1.5290 |
| Cladding 1-1 | 1.5365 | 1.5309 | 1.5249 | 1.5217 |
| Cladding 2-1 | 1.5298 | 1.5250 | 1.5187 | 1.5158 |
| Cladding 3-1 | 1.5257 | 1.5206 | 1.5150 | 1.5116 |

Finally, an ytterbium-doped glass composition of $63P_2O_5 \cdot 8.5Al_2O_3 \cdot 3$ $(Er_2O_3+La_2O_3+Yb_2O_3) \cdot 9.5BaO \cdot 16Li_2O$ (mole %), chosen based upon modeling and the spectral characterization results of the non-ytterbium doped glasses, was melted at 1350° C. in a platinum crucible using high purity starting chemicals. This glass composition contains 3.5 weight % erbium. The refractive index of this glass composition was measured with a prism coupler at 632.8 nm, 1300 nm and 1550 nm. The absorption and emission cross sections were determined to be $0.75 \times 10^{-20}$ cm$^2$ and $0.82 \times 10^{-20}$ cm$^2$ at 1534 nm, respectively. The thermal expansion coefficient, glass transition temperature, and softening temperature of the ytterbium-doped core glass were measured to be $8.7 \times 10^{-6}$ °C.$^{-1}$, 439° C., and 480° C., respectively. The cladding glass was designed to match the thermal performance of the ytterbium-doped core glass to ensure low stress in the fiber. The difference in thermal properties between the ytterbium-doped core glass and the designed cladding glass is less than 3%.

Fabrication and Characterization of Erbium-doped Phosphate Glass Fiber

Figure 6:
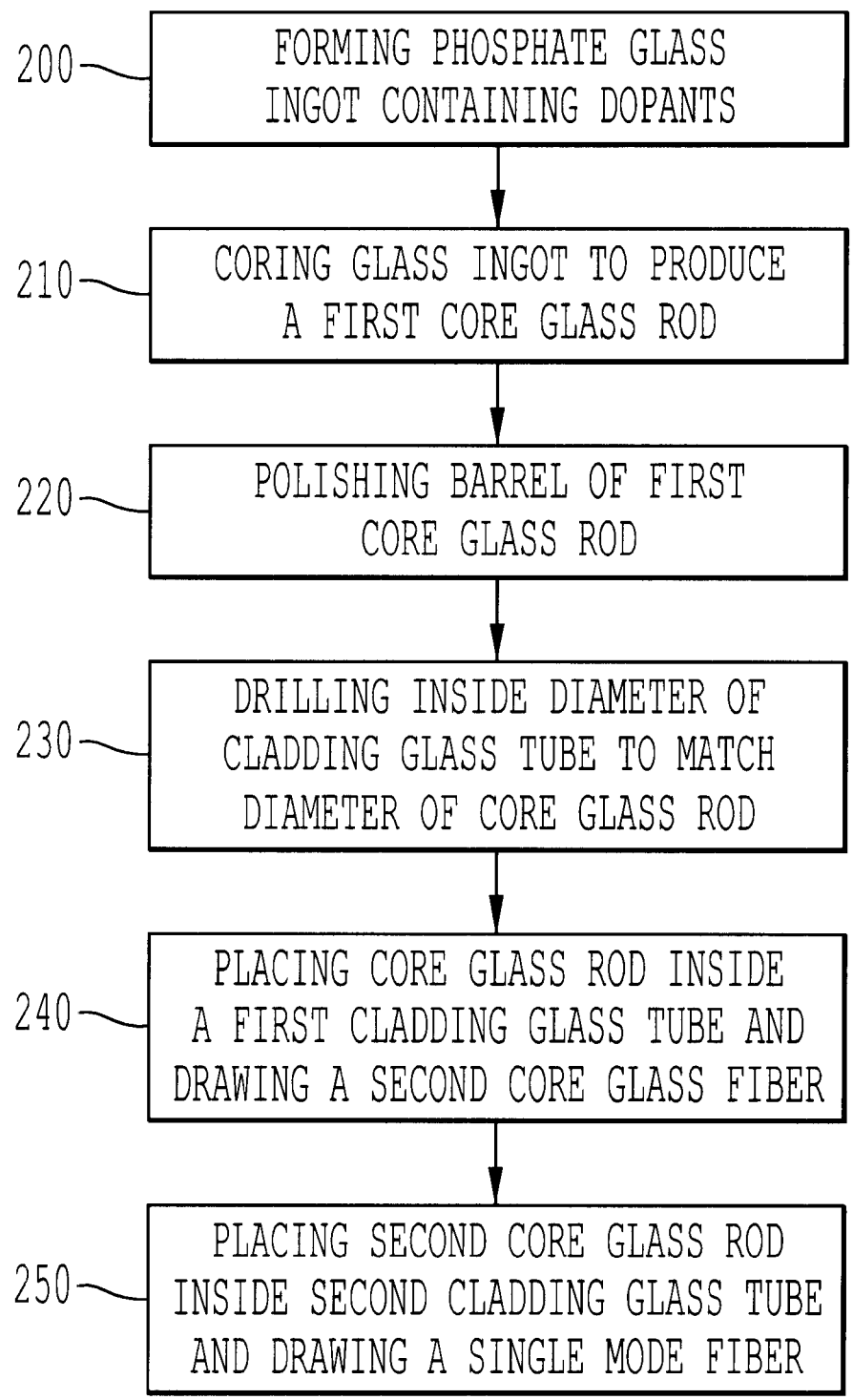
FIG. 6 is a flowchart showing the method steps for producing doped single mode phosphate glass fibers.

In another embodiment of the present invention, a rod in tube technique was utilized to prepare single mode phosphate glass fibers. FIG. 6 illustrates the steps of producing the single mode phosphate glass fibers. Referring to FIG. 6, a phosphate glass ingot containing dopants is formed in step 200. Once the ingot is formed, the ingot is cored to produce in step 210 a first core glass rod. The first core glass rod has a barrel of the glass rod polished in step 220. In step 230, a cladding glass tube (i.e. a tube without erbium or ytterbium dopants) is drilled to have an inside diameter within 0.1 mm of the outside diameter of the first core glass rod. In step 240, the first core glass rod is placed inside the first cladding glass tube, and the assembly is drawn to form a second core glass rod. The second core glass rod is placed, in step 250, inside a second cladding glass tube, and the assembly is drawn into a single mode fiber. Fiber drawings were performed in an argon gas atmosphere to reduce absorption of water from air exposure which causes fluorescence quenching of Er$^{3+}$ ions.

Figure 7:
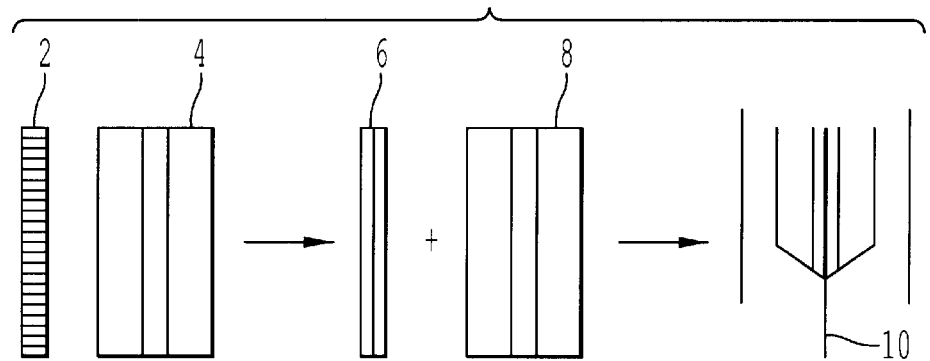
FIG. 7 is a diagram showing schematically the stages of the fabrication process for producing the single mode doped phosphate glass fibers.

FIG. 7 shows schematically the representative steps of the present invention. A bulk glass rod (not shown) was doped for example with 3.5 weight % erbium. A first core glass rod 2 was drilled from a bulk glass, and the barrel of the first core glass rod 2 was polished. Both inside and outside surfaces of a glass cladding tube 4 made from the cladding glass were polished. The inside diameter of the cladding tube 4 was matched to within 0.1 mm of the diameter of the first core glass rod 2. Next, the 3 mm core glass rod 2 and the 12 mm cladding tube 4 were drawn into a second core glass rod 6 with a 3 mm outside diameter. The second core glass rod 6 together with a second cladding tube 8 were drawn into a single mode fiber 10. The fiber drawing was performed at 765° C. No plastic coating was applied to the fiber.

Figure 8:
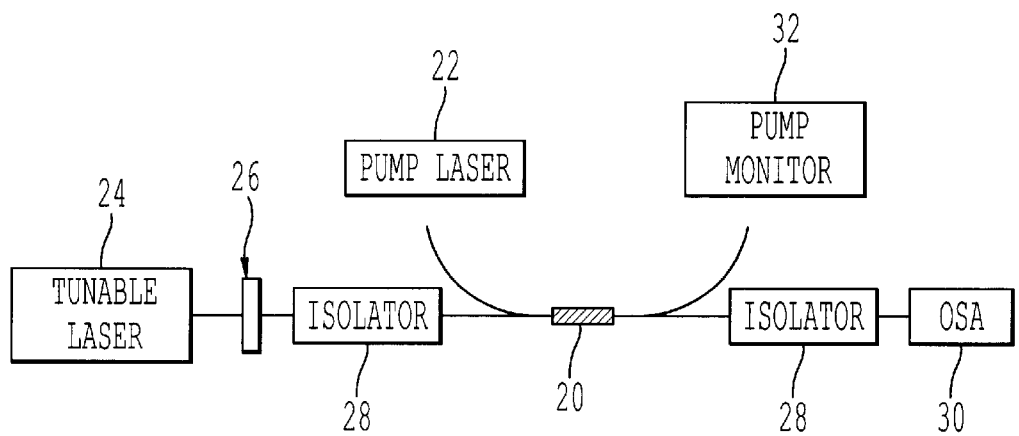
FIG. 8 is a schematic diagram showing the experimental setup used to determine gain characterization of a co-doped phosphate glass fiber.

After fabrication of erbium doped glass fibers, gain characterizations of the fibers were made. FIG. 8 shows the experimental setup for gain characterization. An erbium-doped fiber 20 whose core contained 3.5 weight % erbium was pumped using a 980 nm laser diode 22 stabilized by fiber Bragg gratings (not shown). An external cavity tunable laser diode 24, tunable from 1530 nm to 1570 nm was used as a signal source. An attenuator 26 was used to vary the input signal strength. Pump and signal beams were combined by a 980/1550 fiber multiplexer (not shown). The erbium-doped fibers were placed on V-grooves. Two fiber in-line isolators 28 for the signal were used. The output fiber is connected to the optical spectrum analyzer (OSA) 30. A pump monitor 32 was used to ensure that the pump signal did not vary during measurement of optical gain.

A single mode fiber consisting of a 3.5 weight percent concentration erbium doped phosphate glass core with an undoped glass cladding was fabricated using the rod in tube technique previously discussed. The phosphate glass fibers with the 3.5 weight percent concentration of erbium were fabricated by the rod in tube technique. One phosphate glass rod uniformly doped with 3.5 weight % erbium and two phosphate glass tubes without erbium doping were used in the drawing processes. A single mode fiber was obtained. The fiber core was 4 μm in diameter with an erbium concentration of $3.7 \times 10^{-20}$ cm$^{-3}$.

A 980 nm semiconductor laser diode was used as pumping source. An external cavity tunable laser diode, tunable from 1530 nm to 1570 nm was used as a signal source. A net gain of 15.5 dB was achieved at 1535 nm from a 5.1 cm long fiber. The internal gain is 17.5 dB. The net gain per unit length is 3 dB/cm, which is the highest erbium doped fiber net gain ever obtained.

The refractive indices were measured by the prism coupling method. The numerical aperture of erbium-doped fiber was calculated to be 0.25 using the measured refractive indices of the core and cladding glasses at the wavelength of 1535 nm. Absorption cross section was calculated from the measured absorption spectrum. The effective linewidth is 46 nm for the $^4I_{15/2}$–$^4I_{13/2}$ transition. Emission cross section was calculated from the absorption cross section and emission spectrum by McCumber theory. The emission spectrum and fluorescence lifetime for the $^4I_{13/2}$–$^4I_{15/2}$ transition of $Er^{+3}$ were measured in a 2 mm long phosphate fiber at low pump power. The measured emission spectrum for 1.5 μm band in the fiber was similar to that in the bulk material. The propagation loss of 0.1 dB/cm was measured at a wavelength of 1.3 μm.

The rod-in-tube technique was once again utilized to fabricate erbium doped phosphate glass fibers. A core glass rod was drilled from the bulk glass material formed in the melt at 1350° C., and the barrel of the rod was polished. The inside diameter of a cladding tube was matched to within 0.1 mm with the diameter of the core glass. The fiber drawing temperature was 765° C. As before, two drawings were used. The erbium ion concentration of the fiber core is 3.5 weight %. No plastic coating was applied to the fiber. The numerical aperture of the erbium-doped fiber was calculated to be 0.216 at 1550 nm. Fibers with core diameters of 4 μm, 5 μm, and 6 μm were fabricated. The propagation loss of 0.3 dB/cm was estimated at 1.3 μm using the cut-back method.

A fiber with a core diameter of 5 μm was tested. A 5.1 cm long erbium doped fiber was pumped using a 980 nm laser diode stabilized by fiber Bragg gratings. An external cavity tunable laser diode, tunable from 1530 nm to 1570 nm was used as a signal source. Pump and signal beams were combined by a 980/1550 fiber multiplexer. 245 mW of pump power were available at the output of the multiplexer. The 5 μm fiber was placed on a V-groove. Two in-line isolators for the signal were used. The output fiber was connected to the optical spectrum analyzer. The coupling loss was estimated to be 1 dB at 1.3 μm.

Figure 9:
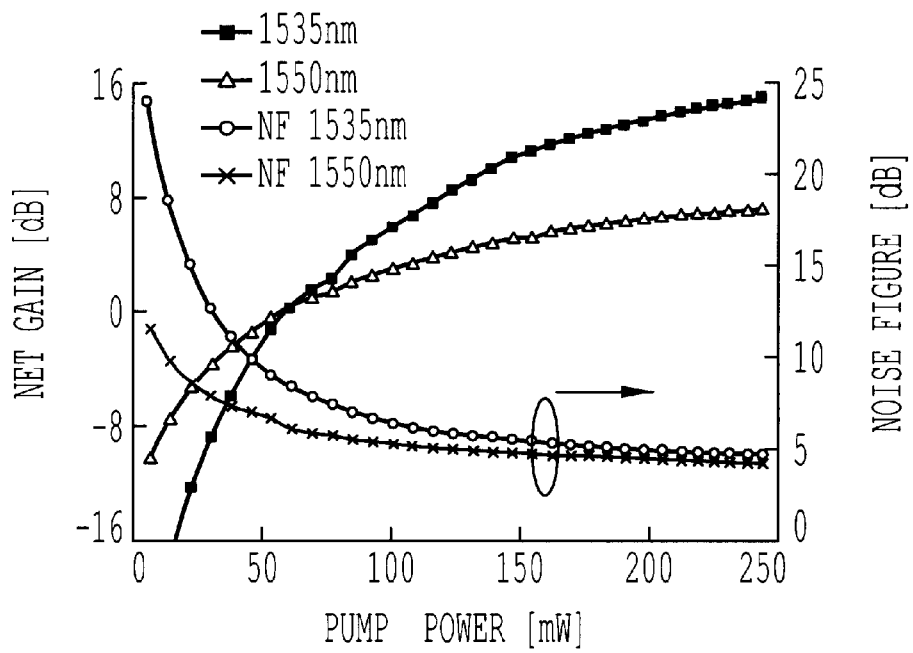
FIG. 9 is a graph showing the net gain and noise figure for an erbium doped phosphate glass fiber as a function of pump power.

FIG. 9 illustrates the net gain and noise figure versus the pump power at 1535 nm and 1550 nm for the 3.5 weight % erbium, 5 μm core diameter erbium-doped fiber of the present invention. The input signal power was −31 dBm. A net gain of 15.5 dB was achieved at 1535 nm, and the internal gain is 17.5 dB. The net gain per unit length of 3 dB/cm, was once again obtained. The internal noise figures are approximately 1 dB below noise figures shown in FIG. 9, which indicates that a noise figure close to 4 dB could be readily achieved by reducing the coupling losses. Gain saturation was not observed in this experiment, suggesting a higher gain is achievable at higher pumping power.

According to the present invention, doping with erbium improves the gain of the phosphate glass fibers Based on internal modeling results, the pump power needed to reach a 15 dB net gain is around 100 mW, given the high energy transfer efficiency.

Figure 10:
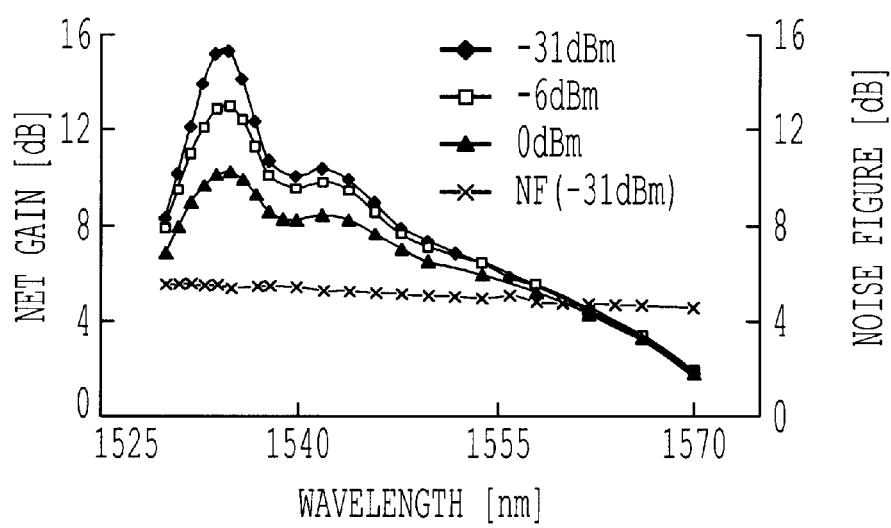
FIG. 10 is a graph showing the net gain and noise figure for an erbium doped phosphate glass fiber as a function of signal wavelength.

FIG. 10 illustrates net gain as a function of signal wavelength with different signal powers for the 5 μm core diameter erbium-doped optical fiber of the present invention. The pump power is 245 mW. The signal wavelength was tuned from 1530 to 1570 nm. As shown in FIG. 10, the gain profile extends towards longer wavelengths and decreases dramatically at shorter wavelengths. This profile agrees well with the above-noted absorption and emission cross section results and numerical modeling. FIG. 10 shows that the net gain decreases significantly near the peak wavelength when the signal power was increased from −6 dBm to 0 dBm. This decrease is caused by gain saturation.

Figure 11:
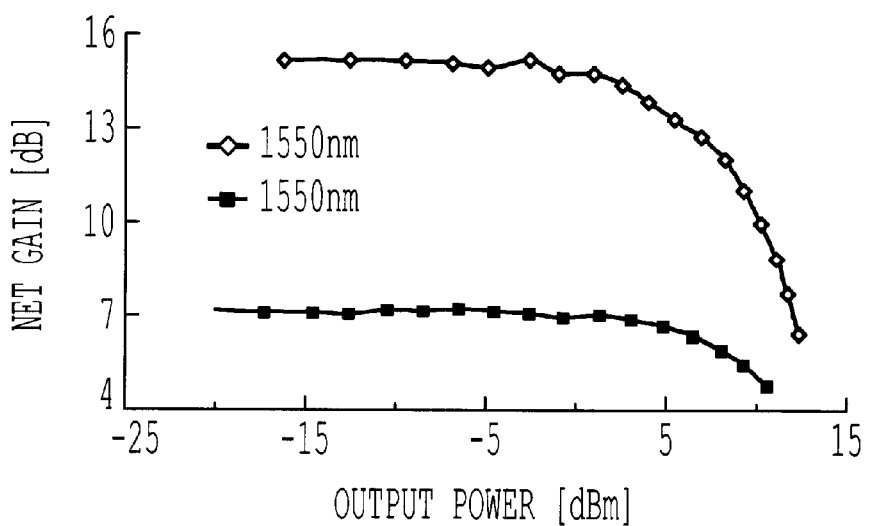
FIG. 11 is a graph showing the gain saturation at 1535 nm and 1550 nm for an erbium doped phosphate glass fiber.

FIG. 11 shows gain saturation at 1535 nm and 1550 nm for the 5 μm core diameter erbium-doped fiber of the present invention. The saturation output power (defined as the output power where the gain is 3 dB below the maximum gain) at 1535 nm and 1550 nm are 8 dBm and 10 dBm, respectively. The input saturation power at 1550 is 5.5 dBm. This result agrees with the results in FIG. 10 where the net gain at the longer wavelength with different signal power does not change too much.

Thus, the phosphate fibers of the present invention, manufactured according to one embodiment of the present invention using a rod in tube technique, show minimal inefficiency from cooperative upconversion. Consequently, with respect to manufacture, cost, and performance, the phosphate fibers of the present invention are integrated into optical components such as splitters, couplers, waveguide gratings, and modulators. An integrated approach dramatically reduces component cost and meets the demand for high amplification in metro and local network applications.

Amplifying Splitter

Figure 12:
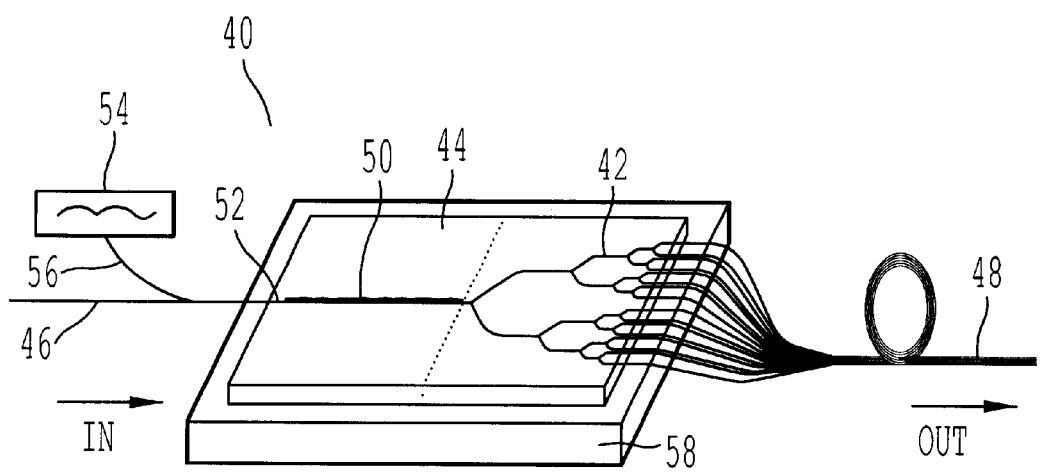
FIG. 12 is a schematic of an amplifying splitter according to the present invention.

An amplifying splitter 40 of the present invention shown in FIG. 12 includes a splitter 42 and a phosphate glass fiber amplifier 44 of the present invention. The amplifying splitter 40 is a 1×n device with one input port 46 and multiple output ports 48 for dividing optical signals about 1.54 μm, the optical fiber communication window. The amplifying splitter 40 divides optical signals without any intensity loss by employing the phosphate glass fiber amplifier 44 with high gain per unit length. The amplifying splitter 40 integrates a passive optical component, such as for example the splitter 42, with a high performance, a compact fiber amplifier, such as for example the fiber amplifier 44. The fiber amplifier 44 is a doped phosphate glass fiber 50, inserted and epoxied to a groove, such as for example a V-groove 52, and coupled to an optical pump 54, such as for example a solid state laser emitting at 980 nm. The optical pump 54 propagates laser light in a direction opposite to a propagation direction of the split signals. The laser light is coupled into the phosphate glass fiber 50 by a 980/1550 fiber multiplexer 56. The fiber amplifier 44 and the splitter 42 are bonded to a substrate 58 to form a quasi-monolithic device. The amplifying splitter 40 is pigtailed with single mode fibers and packaged in a compact, rugged environmentally stable case (not shown). The amplifying splitter 40 exhibits high gain, high port-to-port uniformity, low insertion loss, low back reflection, and low polarization dependent loss.

Existing splitters are only 50% efficient for a single source, two output port (1×2) device. That is, the device divides the light intensity. In a more typical source, a sixteen output port (1×16) splitter, the loss would be 94%. To counter this loss, current networks must employ expensive optical power boosting amplifiers.

The amplifying splitter 40 of the present invention with high gain compensates for losses in splitters. The amplifying splitter uses low cost erbium and ytterbium co-doped phosphate glass fiber amplifier technology. The amplifying splitter 40 is a device that can be used in a fiber optic network to split an optical fiber input into several fiber optic outputs, without any loss of output light intensity from each port. Optical splitter use is expected to grow strongly as fiber networks reach closer and closer to end users, such as in short haul terrestrial systems and metro optical networks. The amplifying splitter 40 finds application in fiber-to-the-curb and fiber-to-the-home applications.

Figure 13:
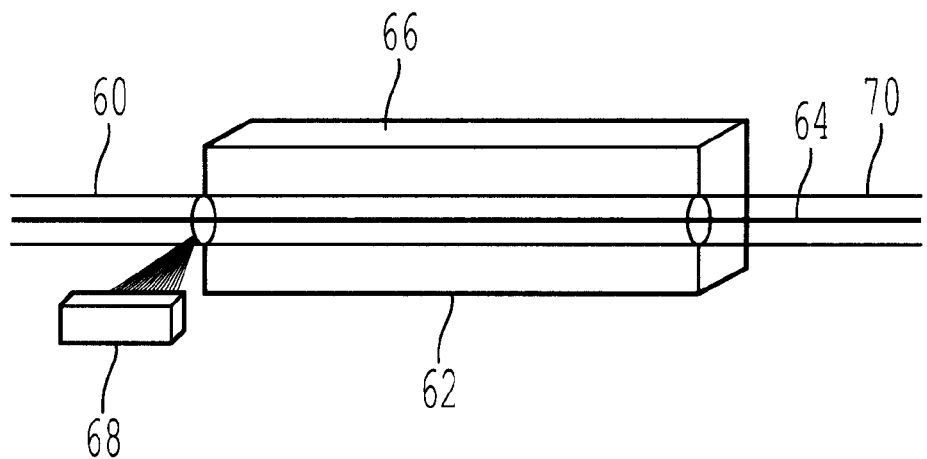
FIG. 13 is a schematic of a fiber amplifier pumped with a multi-mode laser.

Besides using a fiber multiplexer to couple laser light to a fiber amplifier, the fiber amplifier 44 is pumped, according to one embodiment of the present invention, with a low cost multi-mode diode laser. The multi-mode laser emits light from 900 to 1000 nm. FIG. 13 is a schematic illustrating pumping of a fiber amplifier with a multi-mode diode laser lasing near 980 nm. A silica fiber 60 introduces an optical signal to a single fiber amplifier 62. The single fiber amplifier 62 includes a doped phosphate single-mode glass fiber 64 attached to a substrate 66. A multi-mode diode laser 68 pumps the single-mode fiber 64. The beam diameter of the diode laser is focused to approximately 80 $\mu$m. The amplified signal is transmitted forward to an output silica fiber 70.

Figure 14:
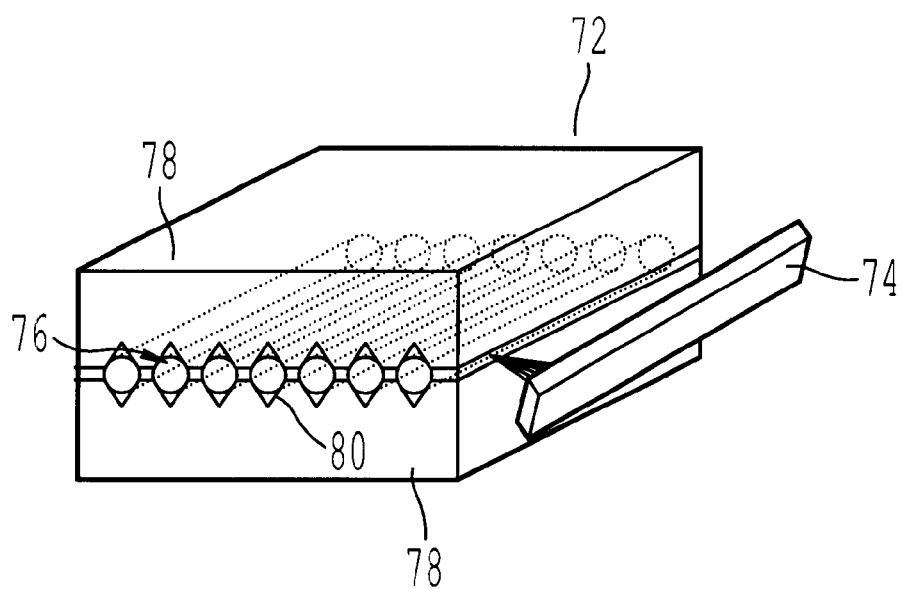
FIG. 14 is a schematic of a fiber array amplifier according to the present invention.

Further still, as shown in FIG. 14, more than a single fiber can be pumped with a multi-mode laser. A fiber array amplifier 72 is utilized to amplify input optical signals. The fiber array amplifier 72 includes a multi-mode diode laser bar 74 which pumps a side of an array 76 of doped phosphate glass fibers. The array 76 of doped fibers exhibit high gain per unit length and are placed orthogonal to the multi-mode diode laser bar 74. The length of the rare-earth doped fibers is a few centimeters, such as for example 5 cm. The multi-mode diode laser bar 74 excite the array 76 from the side and/or the top of the substrate. As shown in FIG. 14, the phosphate glass fibers are placed within two V-grooved substrates 78. Inside surfaces of two V-grooved substrates 78 are coated with a metallic coating 80 to reduce scattering of the pump laser, ensuring a high pumping efficiency. Less than 100 mW absorbed pump is needed to excite each fiber. With this approach, significant cost reduction is realized since the cost of multi-mode laser diode bar is significantly lower than the cost of a single mode diode laser.

The fiber array amplifier 72 could be used in an amplifying splitter by adding the fiber array amplifier 72 to the passive splitter 42 after the input signal has been split. The fiber amplifier 44 may optionally compensate for optical loss in the passive splitter 42.

FIG. 15 is a schematic diagram illustrating the array of glass fibers placed on a surface of a substrate 78 (as shown in FIG. 15a), between two substrates (as shown in FIG. 15b), or in a fiber bundle 80 (as shown in FIG. 15c). The multi-mode diode laser 74 is shown at several alternative positions by which the array 76 of phosphate glass fibers can be pumped. The optical transparency of the substrates 78 and the high absorption strength of the high gain doped phosphate fiber enables pumping of the fiber amplifier.

Amplifying Combiner

Figure 16:
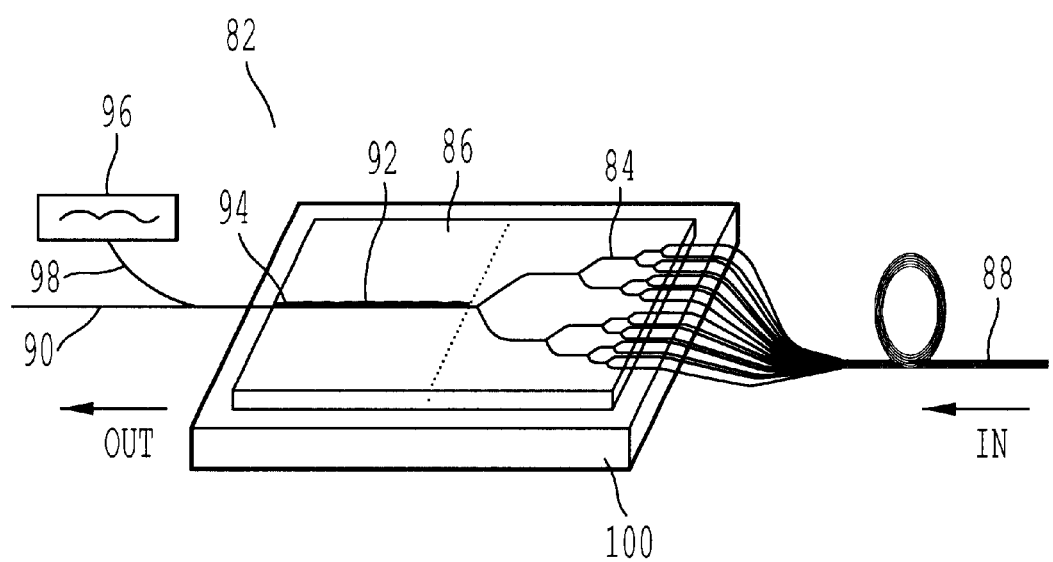
FIG. 16 is a schematic of an amplifying combiner according to the present invention.

FIG. 16 illustrates an amplifying combiner 82 of the present invention. Combiner 82 integrates a passive wavelength combiner 84 with a phosphate glass fiber amplifier 86. The combiner 84 and the amplifier 86 are separately designed and optimized before being assembled together into one package. The amplifying combiner 82 is a n×1 device with n multiple input ports 88 and one output port 90 for combining a variety of optical signal wavelengths around 1.54 $\mu$m, the optical fiber communication window. The amplifying combiner 82 combines the n multiple ports 88 without any intensity loss by employing the phosphate glass fiber amplifier 86 with extremely high gain per unit length. The fiber amplifier 86 is a co-doped phosphate glass fiber 92, inserted and fixed to a V-groove 94, coupled to an optical pump 96 such as for example a solid state laser emitting at 980 nm. The optical pump 96 propagates laser light in a direction opposite to a propagation direction of the combined signals. The laser light is coupled into the phosphate glass fiber 92 by a 980/1550 fiber multiplexer 98. The wavelength combiner 84 and fiber amplifier 86 are bonded to a substrate 100 to form a quasi-monolithic device. The amplifying combiner 82 is pigtailed with single mode fibers and packaged in a compact, rugged environmentally stable case (not shown). The amplifying combiner 82 exhibits high gain, low insertion loss, low back reflection, and low polarization dependent loss.

The amplifying combiner 82 is a device which could be used in a fiber optic network to combine and amplify optical signals. Use of the amplifying combiner 82 is expected to grow strongly as DWDM devices evolve and become more prevalent in optical networks.

As with the amplifying splitter 40, the fiber array amplifier 72 can be used in an amplifying combiner by adding the fiber array amplifier 72 to the combiner 84 before the input signals have been combined. The fiber amplifier 86 may or may not be utilized to compensate for optical loss in the combiner 84.

Amplifying Arrayed Waveguide Gratings

Figure 17:
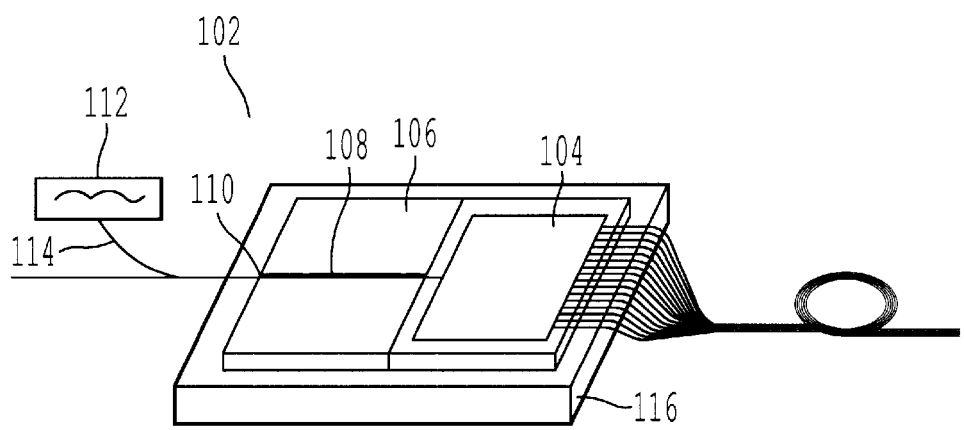
FIG. 17 is a schematic of an amplifying arrayed waveguide grating according to the present invention.

As shown in FIG. 17, the present invention includes amplifying arrayed waveguide gratings 102 which integrate arrayed waveguide gratings (AWG) 104 with a compact phosphate glass fiber amplifier 106. The typical attenuation for AWG DWDM devices is 5 to 7 dB. The compact co-doped phosphate glass fiber amplifiers of the present invention can compensate this attenuation in order to simplify the system design. The amplifying arrayed waveguide gratings 102 is a device which resolves optical signal wavelengths around 1.54 $\mu$m, the optical fiber communication window, into specific frequency signals (i.e signals at 1.50 $\mu$m, 1.52 $\mu$m, 1.54 $\mu$m, 1,56 $\mu$m, etc.). The fiber amplifier 106 is a doped phosphate glass fiber 108, inserted and fixed to a V-groove 110, coupled to an optical pump 112 such as for example a solid state laser emitting at 980 nm. Light from the solid state laser is coupled into the phosphate glass fiber 108 by a 980/1550 fiber multiplexer 114. The arrayed waveguide gratings 104 and the fiber amplifier 106 are bonded to a substrate 116 to form a quasi-monolithic device. The amplifying arrayed waveguide gratings 102 is packaged in a compact, rugged environmentally stable case (not shown). The amplifying arrayed waveguide gratings 102 exhibits high gain, low insertion loss, low back reflection, and low polarization dependent loss.

Utilization of the amplifying arrayed waveguide is expected to grow strongly as DWDM devices evolve and become more prevalent in optical networks.

As with the amplifying splitter 40, the fiber array amplifier 72 could be used in an amplifying arrayed waveguide gratings 102 by adding the fiber array amplifier 72 to the passive waveguide grating 104 after the input signals have been resolved. The fiber amplifier 106 may or may not be utilized to compensate for optical loss in the grating 104.

Amplifying Modulator

Figure 18:
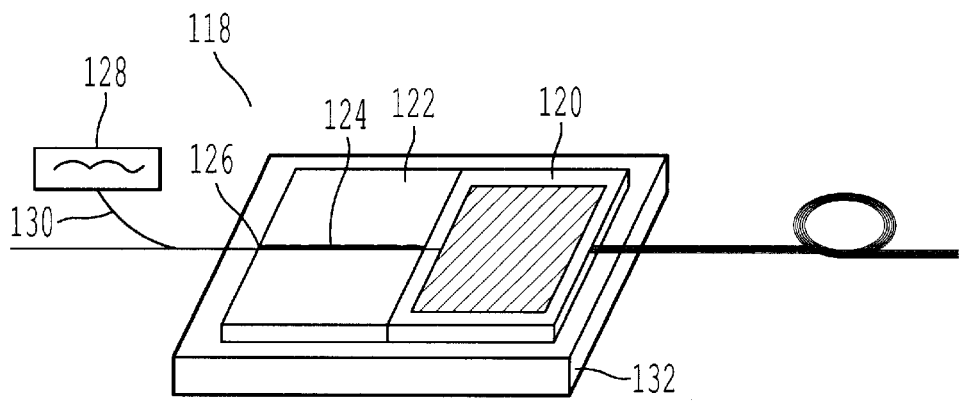
FIG. 18 is a schematic of an amplifying modulator according to the present invention.

Lithium niobate modulators are known in the art and have the following advantages: compatibility with optical fiber, high frequency bandwidth (up to 40 GHz), low driving voltage, and rugged and all solid state construction. A further advantage of a lithium niobate modulator is that multiple optical components can be integrated into a single chip. In a similar approach to the above-mentioned splitter, combiner, and arrayed waveguide gratings, an amplifying modulator 118 of the present invention as shown in FIG. 18 integrates a lithium niobate modulator 120 with a compact phosphate glass fiber amplifier 122. This integration provides a mechanism to compensate for insertion loss from the lithium niobate modulator 120. The amplifying modulator 118 compensates for intensity loss from the lithium niobate modulator 120 by employing the fiber amplifier 122 with extremely high gain per unit length. The fiber amplifier 122 is a doped phosphate glass fiber 124, inserted and fixed to a V-groove 126, coupled to an optical pump 128 such as for example a solid state laser emitting at 980 nm. The laser light is coupled into the phosphate glass fiber 124 by a 980/1550 fiber multiplexer 130. The amplifying modulator 118 and the fiber amplifier 122 are bonded to a substrate 132 to form a quasi-monolithic device. The amplifying modulator 118 is packaged in a compact, rugged environmentally stable case (not shown). The amplifying modulator 118 exhibits high gain, low insertion loss, low back reflection, and low polarization dependent loss.

Typical attenuation for a lithium niobate modulator can be between 0.5 to 3 dB. The low cost erbium and ytterbium co-doped phosphate glass fiber amplifier of the present invention allows for mated structures to the lithium niobate integrated optical component chip package and provides amplification before sending or receiving an optical signal. The amplifying modulator will help substantially in management of power losses in metro and local loop applications.

As with the amplifying splitter 40, the fiber array amplifier 72 could be used with an amplifying modulator 118. Adding the fiber array amplifier 72 to the modulator 118 enables amplification of multiple input signals before modulation.

Large Core Fiber Amplifier

Figure 19:
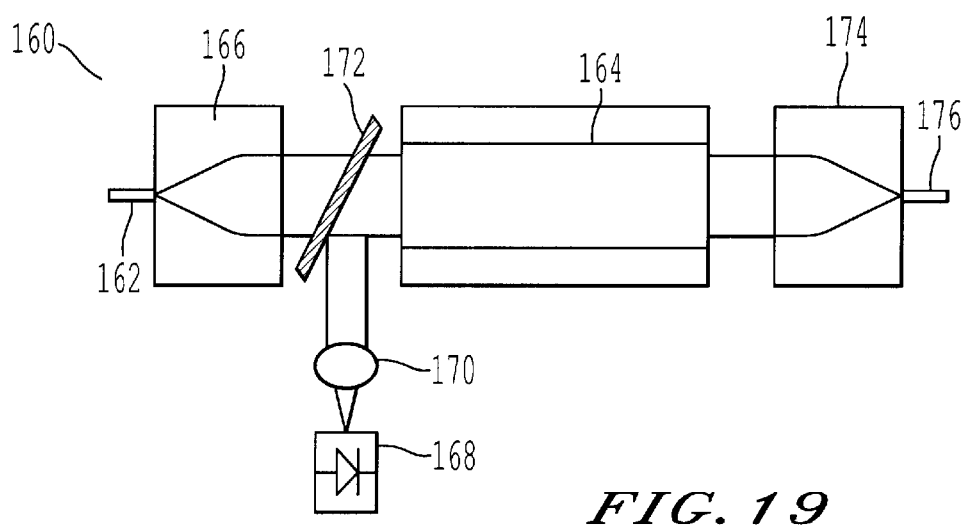
FIG. 19 is a schematic illustration of a large core fiber amplifier.

FIG. 19 is a schematic illustration of a large core fiber amplifier 160 of the present invention. The core diameter ranges from 50 $\mu$m to 300 $\mu$m. Typically in fiber amplifiers, the light-guiding region (i.e., the core of the fiber) is only about 5 $\mu$m in diameter. Such a small core diameter allows only a single-mode propagation of the light at a signal wavelength around 1550 nm. According to the present invention, the high gain coefficient enables the use of short amplifying fibers that can be assembled in V-grooves without bending the fibers. This compactness enables the use of large core fibers that are not single-mode. Due to the short length and stable and rugged packaging, light that is coupled to the fundamental mode of the fiber, remains mostly in the fundamental mode with very little coupling to the other modes of the fiber. As shown in FIG. 19, light is coupled, from input single-mode fiber 162, predominantly into the fundamental mode of a large core fiber 164 using conventional micro-optic techniques, such as for example a collimating lense 166. A key benefit of this embodiment is that high power 980 nm multi-mode light-emitting laser diodes 168 pump the core fiber 164 by introducing the laser light with a lense 170 through a split mirror 172 onto the core fiber 164. Light is coupled from the multi-mode laser diodes 168 into the fiber core with high efficiency, which is not possible with the small core diameter fiber amplifiers. The multi-mode laser diodes have an emitting cross-sectional area on the order of 1 $\mu$m×100 $\mu$m. A second collimating lense 174 focuses the light onto an output fiber 176.

Numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A phosphate glass optical fiber amplifier, comprising:
   a phosphate glass fiber including the following ingredients by weight percentages,
   $P_2O_5$ from 30 to 80 percent,
   $Er_2O_3$ from 25 to 12 percent,
   $L_2O_3$ from 5 to 30 percent,
   MO from 5 to 30 percent,
   wherein MO is selected from the alkaline earth oxide group consisting of BaO, BeO, MgO, SrO, CaO, ZnO, PbO and mixtures thereof, and $L_2O_3$ is selected from the transition metal oxide group consisting of $Al_2O_3$, $B_2O_3$.$Y_2O_3$, $La_2O_3$, and mixes thereof; and
   a first optical pump configured to pump at least erbium ionic energy levels in said glass fiber, wherein introduction of an input optical signal produces stimulated emission and amplification of said input signal.

2. The optical fiber amplifier of claim 1, comprising a substrate on which the fiber is surface mounted.

3. The optical fiber amplifier of claim 2, wherein the substrate comprises a V-groove in which the fiber is mounted.

4. The optical fiber amplifier of claim 1, comprising a pair of substrates between which the fiber is surface mounted.

5. The optical fiber amplifier of claim 4, wherein at least one of said pair of substrates comprises a V-groove in which the fiber is mounted.

6. The optical fiber amplifier of claim 1, wherein the optical pump comprises a laser.

7. The optical fiber amplifier of claim 6, wherein the laser comprises a laser configured to emit 980 nm light.

8. The optical fiber amplifier of claim 1, wherein the optical pump comprises a multi-mode laser.

9. The optical fiber amplifier of claim 8, wherein the multi-mode laser comprises a multi-mode laser configured to emit light from 900 to 1000 nm.

10. The optical fiber amplifier of claim 9, wherein the multi-mode laser comprises a laser diode.

11. The optical fiber amplifier of claim 9, wherein the laser diode is configured to emit light orthogonal to said glass fiber.

12. The optical fiber amplifier, of claim 1, wherein the fiber is manufactured by a rod-in-tube process.

13. The optical fiber amplifier of claim 1, wherein the fiber has a length from 5 mm to 25 cm.

14. The optical fiber amplifier of claim 1, wherein the fiber has a length from 5 to 50 mm.

15. The optical fiber amplifier of claim 1, further comprising by weight $Yb_2O_3$ from 0 to 12 percent, wherein the ytterbium and erbium concentrations in the glass fiber are each greater than 2.5 wt. %.

16. The optical fiber amplifier of claim 15, wherein MO includes BaO and ZnO and the glass fiber has a temperature coefficient of refractive index from $-2.0 \times 10^{-6}$ to $2.0 \times 10^{-6}$.

17. The optical fiber amplifier of claim 15, wherein said concentration of BaO ranges up to 30 wt. % and the said concentration of ZnO ranges up to 20 wt. %.

18. The optical fiber amplifier of claim 15, wherein $L_2O_3$ comprises $Al_2O_3$ in a concentration from 4 to 10 wt. %.

19. The optical fiber amplifier of claim 15, wherein said phosphate glass fiber comprises at least 2.5 wt. % of both erbium and ytterbium.

20. The optical fiber amplifier of claim 19, wherein MO includes BaO and ZnO and the glass fiber has a temperature coefficient of refractive index from $-2.0 \times 10^{-6}$ to $2.0 \times 10^{-6}$.

21. The optical fiber amplifier of claim 20, wherein said concentration of BaO ranges up to 30 wt. % and said concentration of ZnO ranges up to 20 wt. %.

22. The optical fiber amplifier of claim 20, wherein $L_2O_3$ comprises $Al_2O_3$ in a concentration from 4 to 10 wt. %.

23. The optical fiber amplifier of claim 19, wherein said phosphate glass fiber has a gain per unit length from 1.5 to 3 dB/cm.

24. The optical fiber amplifier of claim 1, further comprising:
an array of said phosphate glass fibers; and
a second optical pump configured to pump at least erbium ionic energy levels in said array of glass fibers, wherein said energy levels pumped by said second optical pump produce, upon introduction of multiple input optical signals, stimulated emission and amplification of said multiple input signals.

25. The optical fiber amplifier of claim 24, wherein the second optical pump comprises a laser.

26. The optical fiber amplifier of claim 25, wherein the laser of the second optical pump comprises a laser configured to emit 980 nm light.

27. The optical fiber amplifier of claim 24, wherein the second optical pump comprises a multi-mode laser.

28. The optical fiber amplifier of claim 27, wherein the multi-mode laser of the second optical pump comprises a multi-mode laser configured to emit light from 900 to 1000 nm.

29. The optical fiber amplifier of claim 28, wherein the multi-mode laser of the second optical pump comprises a laser diode.

30. The optical fiber amplifier of claim 29 wherein the laser diode is configured to emit light orthogonal to said array of glass fibers.

31. The optical fiber amplifier of claim 24, wherein said phosphate glass fibers in said array have a length from 5 mm to 25 cm.

32. The optical fiber amplifier of claim 31, wherein said phosphate glass fibers in said array have a length from 5 to 50 mm.

33. The optical fiber amplifier of claim 24, further comprising by weight $Yb_2O_3$ from 0 to 12 percent, wherein said phosphate glass fibers in said array have both ytterbium and erbium concentrations greater than 2.5 wt. %.

34. The optical fiber amplifier of claim 33, wherein MO in said phosphate glass fibers in said array includes BaO and ZnO and the glass fibers have a temperature coefficient of refractive index from $-2.0 \times 10^{-6}$ to $2.0 \times 10^{-6}$.

35. The optical fiber amplifier of claim 34, wherein said phosphate glass fibers in said array have said concentration of BaO up 26 mole % and said concentration of ZnO up to 26 mole %.

36. The optical fiber amplifier of claim 34, wherein $L_2O_3$ comprises $Al_2O_3$ in a concentration from 6 to 11 mole %.

37. The optical fiber amplifier of claim 24, comprising a substrate on which the array is surface mounted.

38. The optical fiber amplifier of claim 37, wherein the substrate comprises V-grooves in which the fibers of the array are mounted.

39. The optical fiber amplifier of claim 24, comprising a pair of substrates between which the array is surface mounted.

40. The optical fiber amplifier of claim 39, wherein at least one of said pair of substrates comprises V-grooves in which the fibers of the array are mounted.

41. The optical fiber amplifier of claim 24, comprising a bundle in which said array is packaged.

42. The optical fiber amplifier of claim 1, wherein said fiber has a diameter from 50 to 300 µm.

43. The optical fiber amplifier of claim 42, wherein the optical pump comprises a multi-mode laser.

44. The optical fiber amplifier of claim 43, wherein the multi-mode laser comprises a multi-mode laser configured to emit light from 900 to 1000 µm.

45. The optical fiber amplifier of claim 43, wherein the multi-mode laser comprises a laser diode.

46. A phosphate glass optical fiber attenuator, comprising:
a phosphate glass fiber containing the following ingredients by weight percentages,
$P_2O_5$ from 30 to 80 percent,
$Yb_2O_3$ from 0 to 12 percent,
$Er_2O_3$ from 2.5 to 12 percent,
$L_2O_3$ from 5 to 30 percent,
MO from 5 to 30 percent,
wherein MO is selected from the alkaline earth oxide group consisting of BaO, BeO, MgO, SrO, CaO, ZnO, PbO and mixtures thereof, and $L_2O_3$ is selected from the transition metal oxide group consisting of $Al_2O_3$, $B_2O_3.Y_2O_3$, $La_2O_3$, and mixtures thereof.

47. The optical fiber attenuator of claim 46, comprising a substrate on which the fiber is surface mounted.

48. The optical fiber attenuator of claim 47, wherein the substrate comprises a V-groove in which the fiber is mounted.

49. The optical fiber attenuator of claim 46, comprising a pair of substrates between which the fiber is surface mounted.

50. The optical fiber attenuator of claim 49, wherein at least one of said pair of substrates comprises a V-groove in which the fiber is mounted.

51. The optical fiber attenuator of claim 46, wherein the fiber is manufactured by a rod-in-tube process.

52. The optical fiber attenuator of claim 46, wherein the fiber has a length from 5 mm to 25 cm.

53. The optical fiber attenuator of claim 46, wherein the fiber has a length from 5 to 50 mm.

54. The optical fiber attenuator of claim 46, wherein MO includes BaO and ZnO and the glass fiber has a temperature coefficient of refractive index from $-2.0 \times 10^{-6}$ to $2.0 \times 10^{-6}$.

55. The optical fiber attenuator of claim 54, wherein said concentration of BaO ranges up to 26 mole % and the said concentration of ZnO ranges up to 26 mole %.

56. The optical fiber attenuator of claim 54, wherein $L_2O_3$ comprises $Al_2O_3$ in a concentration from 6 to 11 mole %.

57. An optical device comprising:
phosphate glass fiber amplifier including,
at least one phosphate glass fiber containing at least erbium dopants, said fiber being substantially free of $R_2O$, wherein $R_2O$ is selected from the alkali metal oxide group consisting of $Li_2O$, $K_2O$, $Na_2O$, $Rb_2O$, and mixtures thereof,
a substrate configured to hold said phosphate glass fiber, and
a first optical pump configured to excite erbium ionic energy levels in said phosphate glass fiber, wherein said energy levels pumped by said optical pump produce, upon introduction of an input optical signal, stimulated emission and amplification of said input signal; and
an optical component mounted to the substrate.

58. The device of claim 57, wherein the phosphate glass fiber comprises both erbium and ytterbium concentrations of at least 1.5 weight %.

59. The device according to claims 57 or 58, wherein the substrate comprises a groove to locate said phosphate glass fiber.

60. The device of claim 59, wherein the groove comprises a V-shaped groove.

61. The device of claim 60, wherein said fiber has a diameter from 50 to 300 μm.

62. The device according to claims 57 or 58, wherein the first optical pump comprises a laser.

63. The device of claim 62, wherein the laser comprises a laser configured to emit 980 nm light.

64. The device according to claims 57, or 58, wherein the first optical pump comprises a multi-mode laser.

65. The device of claim 64, wherein the multi-mode laser comprises a multi-mode laser configured to emit light from 900 to 1000 nm.

66. The device of claim 64, wherein the multi-mode laser is configured to emit light orthogonal to said glass fiber.

67. The device according to claims 57, or 58, wherein said optical component comprises a splitter.

68. The device according to claims 57 or 58, wherein said optical component comprises a combiner.

69. The device according to claims 57 or 58, wherein said optical component comprises a waveguide grating.

70. The device according to claims 57 or 58, wherein said optical component comprises a modulator.

71. The device of claim 70, wherein said modulator comprises a lithium niobate modulator.

72. The device according to claims 57 or 58 wherein the phosphate glass fiber contains greater than 2.5 wt. % of at least one of erbium and ytterbium.

73. The device of claim 72, wherein the phosphate glass fiber has a length from 5 mm to 25 cm.

74. The device of claim 72, wherein the phosphate glass fiber has a length from 5 mm to 50 mm.

75. The device of claim 72, wherein the phosphate glass fiber includes concentrations of BaO and ZnO and the glass fiber has a temperature coefficient of refractive index from $-2.0 \times 10^{-6}$ to $2.0 \times 10^{-6}$.

76. The device of claim 75, wherein said concentration of BaO ranges up to 30 wt. % and said concentration of ZnO ranges up to 20 wt. %.

77. The device of claim 76, wherein the phosphate glass fiber contains $Al_2O_3$ with a concentration from 4 to 10 wt. %.

78. The device of claim 75, wherein said optical component comprises a splitter.

79. The device of claim 75, wherein said optical component comprises a combiner.

80. The device of claim 75, wherein said optical component comprises a waveguide grating.

81. The device of claim 75, wherein said optical component comprises a modulator.

82. The device of claim 81, wherein said modulator comprises a lithium niobate modulator.

83. The device according to claims 57 or 58, further comprising:
an array of said phosphate glass fibers; and
a second optical pump configured to pump at least erbium ionic energy levels in said array of glass fibers, wherein said energy levels pumped by said second optical pump produce, upon introduction of multiple input optical signals, stimulated emission and amplification of said multiple input signals.

84. The device of claim 83, wherein the second optical pump comprises a laser.

85. The device of claim 84, wherein the laser of the second optical pump comprises a laser configured to emit 980 nm light.

86. The device of claim 83, wherein the second optical pump comprises a multi-mode laser.

87. The device of claim 86, wherein the multi-mode laser comprises a multi-mode laser of the second optical pump configured to emit light from 900 to 1000 nm.

88. The device of claim 89, wherein the multi-mode laser is configured to emit light orthogonal to said phosphate glass fibers.

89. The device of claim 83, wherein said phosphate glass fibers in said array have a length from 5 mm to 25 cm.

90. The device of claim 85, wherein said phosphate glass fibers in said array have a length from 5 to 50 mm.

91. The device of claim 83, wherein said phosphate glass fibers in said array have ytterbium and erbium concentrations greater than 2.5 wt. %.

92. The device of claim 91, wherein said phosphate glass fibers include concentrations of BaO and ZnO and the fiber has a temperature coefficient of refractive index from $-2.0 \times 10^{-6}$ to $2.0 \times 10^{-6}$.

93. The device of claim 92, wherein said concentration of BaO ranges up to 26 mole % and said concentration of ZnO ranges up to 26 mole %.

94. The device of claim 92, wherein said phosphate glass fiber contains $Al_2O_3$ with a concentration from 6 to 11 mole %.

95. The device of claim 83, comprising a substrate on which the array is surface mounted.

96. The device of claim 95, wherein the substrate comprises V-grooves in which the fibers of the array are mounted.

97. The device of claim 83, comprising a pair of substrates between which the array is surface mounted.

98. The device of claim 95, wherein at least one of said pair of substrates comprises V-grooves in which the fibers of the array are mounted.

99. The device of claim 83, comprising a bundle in which said array is packaged.

100. The device of claim 83, wherein said optical component comprises a splitter.

101. The device of claim 83, wherein said optical component comprises a combiner.

102. The device of claim 83, wherein said optical component comprises a waveguide grating.

103. The device of claim 83, wherein said optical component comprises a modulator.

104. The device of claim 103, wherein said modulator comprises a lithium niobate modulator.

105. A phosphate glass composition, comprising:
a concentration of $Er_2O_3$ from 1.5 to 12 weight %;
a BaO concentration of x, where $0 < x \leq 30$ wt. %;
a ZnO concentration of y, where $0 < y \leq 20$ wt. %,
wherein the glass composition has a temperature coefficient of refractive index from $-2.0 \times 10^{-6}$ to $2.0 \times 10^{-6}$.

106. The glass composition of claim 105, wherein said concentration of BaO is 24.8 wt. % and said concentration of ZnO is 1.1 wt. %.

107. The glass composition of claim 105, further comprising: a concentration of $Al_2O_3$ from 4 to 10 wt. %.

108. A phosphate glass composition comprising the following ingredients by weight percentages, $P_2O_5$ from 30 to 80 percent,
$Er_2O_3$ from 2.5 to 12 percent,
$L_2O_3$ from 5 to 30 percent,
MO from 5 to 30 percent,
wherein MO is selected from the alkaline earth oxide group consisting of BaO, BeO, MgO, SrO, CaO, ZnO, PbO and mixtures thereof, $L_2O_3$ is selected from the transition metal oxide group consisting of $Al_2O_3$, $B_2O_3.Y_2O_3$, $La_2O_3$, and mixtures thereof, and the glass composition has a temperature coefficient of refractive index from $-2.0 \times 10^{-6}$ to $2.0 \times 10^{-6}$.

109. The glass composition of claim 108, wherein MO includes BaO up to 30 wt. % and ZnO up to 20 wt. %.

110. The glass composition of claim 109, wherein said BaO wt. % is 24.8 wt. % and said ZnO wt. % is 1.1 wt. %.

111. The glass composition of claim 108, wherein $L_2O_3$ comprises $Al_2O_3$ in a concentration from 4 to 10 wt. %.

112. A phosphate glass optical fiber amplifier according to claim 1, further comprising up to 5 percent by weight of $R_2O$, wherein $R_2O$ is selected from the alkali metal oxide group consisting of $Li_2O$, $K_2O$, $Na_2O$, $Rb_2O$, and mixtures thereof.

113. A phosphate glass optical fiber amplifier according to claim 1, wherein the phosphate glass optical fiber is substantially free of $R_2O$, and $R_2O$ is selected from the alkali metal oxide group consisting of $Li_2O$, $K_2O$, $Na_2O$, $Rb_2O$, and mixtures thereof.

114. A phosphate glass optical fiber attenuator according to claim 1, further comprising more than zero percent and tip to 12 percent by weight of $Yb_2O_3$.

115. A phosphate glass optical fiber attenuator according to claim 46, further comprising up to 5 percent by weight of $R_2O$, wherein $R_2O$ is selected from the alkali metal oxide group consisting of $Li_2O$, $K_2O$, $Na_2O$, $Rb_2O$, and mixtures thereof.

116. A phosphate glass optical fiber amplifier according to claim 46, wherein the phosphate glass optical fiber is substantially free of $R_2O$, and $R_2O$ is selected from the alkali metal oxide group consisting of $Li_2O$, $K_2O$, $Na_2O$, $Rb_2O$, and mixtures thereof.

117. A phosphate glass optical fiber attenuator according to claim 46, further comprising more than zero percent and up to 12 percent by weight of $Yb_2O_3$.

118. A phosphate glass optical fiber amplifier according to claim 105, further comprising up to 5 percent by weight of $R_2O$, wherein $R_2O$ is selected from the alkali metal oxide group consisting of $Li_2O$, $K_2O$, $Na_2O$, $Rb_2O$, and mixtures thereof.

119. A phosphate glass optical fiber amplifier according to claim 105, wherein the phosphate glass optical fiber is substantially free of $R_2O$, and $R_2O$ is selected from the alkali metal oxide group consisting of $Li_2O$, $K_2O$, $Na_2O$, $Rb_2O$, and mixtures thereof.

120. A phosphate glass composition according to claim 105, further comprising more than zero percent and up to 12 percent by weight of $Yb_2O_3$.

121. A phosphate glass composition according to claim 108, further comprising up to 5 percent by weight of $R_2O$, wherein $R_2O$ is selected from the alkali metal oxide group consisting of $Li_2O$, $K_2O$, $Na_2O$, $Rb_2O$, and mixtures thereof.

122. A phosphate glass composition according to claim 108, further comprising more than zero percent and up to 12 percent by weight of $Yb_2O_3$.

123. A optical fiber amplifier comprising:
at least one phosphate glass fiber co-doped with erbium ($Er_2O_3$) and ytterbium ($Yb_2O_3$) by weight percentages of at least 2.5% each, and
an optical pump arranged with respect to said phosphate glass fiber and configured to direct light into said co-doped glass fiber to create a population inversion to produce, upon introduction of an optical signal into said glass fiber, stimulated emission and amplification of said optical signal.

124. The optical fiber amplifier according to claim 123, wherein the phosphate glass fiber is less than 7 cm in length and exhibits a gain per unit length of greater than 1.5 dB/cm and a peak gain greater than 3 dB.

125. The optical fiber amplifier according to claim 123, wherein the phosphate glass fiber further comprises the following ingredients by weight percentages:
$P_2O_5$ from 30 to 80 percent;
$L_2O_3$ from 5 to 30 percent; and
MO from 5 to 30 percent,
wherein MO is selected from the alkaline earth oxide group consisting of BaO, BeO, MgO, SrO, CaO, ZnO, PbO and mixtures thereof, and $L_2O_3$ is selected from the transition metal oxide group consisting of $Al_2O_3$, $B_2O_3.Y_2O_3$, $La_2O_3$, and mixtures thereof.

126. The optical fiber amplifier according to claim 125, wherein the glass fiber has a temperature coefficient of refractive index from $-2.0 \times 10^{-6}$ to $2.0 \times 10^{-6}$.

127. The optical fiber amplifier according to claim 126, wherein MO includes BaO and ZnO, and a concentration of BaO ranges up to 30 wt. % and a concentration of ZnO ranges up to 20 wt. %.

128. A phosphate glass optical fiber amplifier according to claim 127, wherein the phosphate glass optical fiber is substantially free of $R_2O$, and $R_2O$ is selected from the alkali metal oxide group consisting of $Li_2O$, $K_2O$, $Na_2O$, $Rb_2O$, and mixtures thereof.

129. A phosphate glass optical fiber amplifier according to claim 125, wherein the phosphate glass optical fiber is substantially free of $R_2O$, and $R_2O$ is selected from the alkali metal oxide group consisting of $Li_2O$, $K_2O$, $Na_2O$, $Rb_2O$, and mixtures thereof.

130. The optical fiber amplifier according to claim 123, wherein the glass fiber has a temperature coefficient of refractive index from $-2.0 \times 10^{-6}$ to $2.0 \times 10^{-6}$.

131. A phosphate glass optical fiber amplifier, comprising:
a phosphate glass fiber having a length from 5 mm to 25 cm, said glass fiber having a core and a cladding including the following ingredients by weight percentages,
$P_2O_5$ from 30 to 80 percent in said core and said cladding,
$Er_2O_3$ of at least 1.5 percent in said core,
$Yb_2O_3$ of at least 2.5 percent in said core,
$L_2O_3$ from 5 to 30 percent in said core and said cladding, wherein $L_2O_3$ is selected $Al_2O_3$, $B_2O_3$, $Y_2O_3$, $La_2O_3$ and mixtures thereof, and
MO from 5 to 30 percent in said core and said cladding, wherein MO is selected from BaO, BeO, MgO, SrO, CaO, ZnO, PbO and mixtures thereof; and
a multi-mode laser that emits light into the cladding to pump erbium and ytterbium ionic energy levels in said core, wherein introduction of an input optical signal in said core produces stimulated emission and amplification of said input signal.

132. The phosphate glass optical fiber amplifier of claim 131, wherein said glass fiber is substantially free of $R_2O$ where $R_2O$ is selected from the alkali metal oxide group consisting of $Li_2O$, $K_2O$, $Na_2O$, $Rb_2O$, and mixtures thereof.

133. The phosphate glass optical fiber amplifier of claim 131, wherein the glass fiber comprises up to 5 percent by weight of $R_2O$, where $R_2O$ is selected from the alkali metal oxide group consisting of $Li_2O$, $K_2O$, $Na_2O$, $Rb_2O$, and mixtures thereof.

134. The phosphate glass optical fiber amplifier of claim 131, wherein the glass fiber comprises $Er_2O_3$ of at least 2.5 weight percent.

135. An optical fiber, comprising:
- an optical fiber having a glass composition that comprises the following ingredients by weight percentages,
- $P_2O_5$ from 30 to 80 percent,
- $Er_2O_3$ of at least 1.5 percent,
- $Yb_2O_3$ of at least 2.5 percent,
- $L_2O_3$ from 5 to 30 percent where $L_2O_3$ is selected from $Al_2O_3$, $B_2O_3$, $Y_2O_3$, $La_2O_3$, and mixtures thereof, and
- MO from 5 to 30 percent where MO is selected from BaO, BeO, MgO, SrO, CaO, ZnO, PbO and mixtures thereof,
- wherein the glass composition is substantially free of $R_2O$ where $R_2O$ is selected from the alkali metal oxide group consisting of $Li_2O$, $K_2O$, $Na_2O$, $Rb_2O$, and mixtures thereof.

136. The optical fiber of claim 135, wherein the glass composition comprises $Er_2O_3$ of at least 2.5 percent.

137. A phosphate glass composition comprising the following ingredients by weight percentages,
- $P_2O_5$ from 30 to 80 percent,
- $Er_2O_3$ from 1.5 to 12 percent,
- $L_2O_3$ from 5 to 30 percent,
- MO from 5 to 30 percent,
- wherein MO is selected from BaO, BeO, MgO, SrO, CaO, ZnO, PbO and mixtures thereof, $L_2O_3$ is selected from $Al_2O_3$, $B_2O_3$.$Y_2O_3$, $La_2O_3$, and mixtures thereof, and the glass composition has a temperature coefficient of refractive index from $-2.0\times10^{-6}$ to $2.0\times10^{-6}$.

* * * * *